(12) United States Patent
Sandberg et al.

(10) Patent No.: US 11,263,133 B2
(45) Date of Patent: Mar. 1, 2022

(54) CACHE CONTROL IN PRESENCE OF SPECULATIVE READ OPERATIONS

(71) Applicant: Arm Limited, Cambridge (GB)

(72) Inventors: Andreas Lars Sandberg, Cambridge (GB); Stephan Diestelhorst, Cambridge (GB); Nikos Nikoleris, London (GB); Ian Michael Caulfield, Cambridge (GB); Peter Richard Greenhalgh, Cambridge (GB); Frederic Claude Marie Piry, Cagnes sur Mer (FR); Albin Pierrick Tonnerre, Nice (FR)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/979,624

(22) PCT Filed: Mar. 12, 2019

(86) PCT No.: PCT/EP2019/056116
§ 371 (c)(1),
(2) Date: Sep. 10, 2020

(87) PCT Pub. No.: WO2019/197106
PCT Pub. Date: Oct. 17, 2019

(65) Prior Publication Data
US 2021/0042227 A1    Feb. 11, 2021

(30) Foreign Application Priority Data

Apr. 12, 2018 (EP) .................................... 18386006

(51) Int. Cl.
*G06F 12/0802* (2016.01)

(52) U.S. Cl.
CPC .... *G06F 12/0802* (2013.01); *G06F 2212/608* (2013.01)

(58) Field of Classification Search
CPC .................................................. G06F 12/0802
(Continued)

(56) References Cited

U.S. PATENT DOCUMENTS

| 6,775,749 B1 | 8/2004 | Mudgett et al. |
| 2005/0154863 A1 | 7/2005 | Steely, Jr. et al. |

(Continued)

OTHER PUBLICATIONS

International Search Report and Written Opinion of the ISA for PCT/EP2019/056116, dated Apr. 5, 2019, 17 pages.
(Continued)

*Primary Examiner* — Jae U Yu
(74) *Attorney, Agent, or Firm* — Nixon & Vanderhye P.C.

(57) ABSTRACT

Coherency control circuitry (10) supports processing of a safe-speculative-read transaction received from a requesting master device (4). The safe-speculative-read transaction is of a type requesting that target data is returned to a requesting cache (11) of the requesting master device (4) while prohibiting any change in coherency state associated with the target data in other caches (12) in response to the safe-speculative-read transaction. In response, at least when the target data is cached in a second cache associated with a second master device, at least one of the coherency control circuitry (10) and the second cache (12) is configured to return a safe-speculative-read response while maintaining the target data in the same coherency state within the second cache. This helps to mitigate against speculative side-channel attacks.

14 Claims, 10 Drawing Sheets

(58) Field of Classification Search
USPC ........................................................ 711/128
See application file for complete search history.

(56)  References Cited

U.S. PATENT DOCUMENTS

| | | |
|---|---|---|
| 2008/0147992 A1 | 6/2008 | Raikin et al. |
| 2009/0106498 A1* | 4/2009 | Lepak ................ G06F 12/0815 |
| | | 711/137 |
| 2011/0238926 A1 | 9/2011 | Fryman et al. |
| 2014/0006698 A1 | 1/2014 | Chappell et al. |

OTHER PUBLICATIONS

Extended Search Report for EP18386006.3, dated Oct. 24, 2018, 11 pages.
"Cache Speculation Side-Channels", Whitepaper, Feb. 2018, version 1.2, 13 pages.

* cited by examiner

Coherency-change-permitting Read:

Safe Spec Read:

CACHE CONTROL IN PRESENCE OF SPECULATIVE READ OPERATIONS

This application is the U.S. national phase of International Application No. PCT/EP2019/056116 filed 12 Mar. 2019, which designated the U.S. and claims priority to EP Patent Application No. 18386006.3 filed 12 Apr. 2018, the entire contents of each of which are hereby incorporated by reference.

The present technique relates to the field of data processing.

A data processing apparatus may support speculative execution of instructions, in which instructions are executed before it is known whether input operands for the instruction are correct or whether the instruction needs to be executed at all. For example, a processing apparatus may have a branch predictor for predicting outcomes of branch instructions so that subsequent instructions can be fetched, decoded and executed speculatively before it is known what the real outcome of the branch should be. Also some systems may support load speculation where the value loaded from memory is predicted before the real value is actually returned from the memory, to allow subsequent instructions to be processed faster. Other forms of speculation are also possible.

At least some examples provide a system comprising:

a plurality of master devices having associated caches; and coherency control circuitry to manage coherency between the caches, based on a coherency protocol which assigns one of a plurality of coherency states to each item of data in a given cache; wherein:

the coherency control circuitry is configured to support processing of a safe-speculative-read transaction received from a requesting master device, the safe-speculative-read transaction of a type requesting that target data is returned to a requesting cache of the requesting master device while prohibiting any change in coherency state associated with the target data in other caches in response to the safe-speculative-read transaction; and in response to the safe-speculative-read transaction, at least when the target data is cached in a second cache associated with a second master device, at least one of the coherency control circuitry and the second cache is configured to return a safe-speculative-read response while maintaining the target data in the same coherency state within the second cache.

At least some examples provide an interconnect comprising:

a plurality of interfaces to communicate with master devices having associated caches; and coherency control circuitry to manage coherency between the caches, based on a coherency protocol which assigns one of a plurality of coherency states to each item of data in a given cache; wherein:

the coherency control circuitry is configured to support processing of a safe-speculative-read transaction received from a requesting master device, the safe-speculative-read transaction of a type requesting that target data is returned to the requesting master device while prohibiting any change in coherency state associated with the target data in caches of other master devices in response to the safe-speculative-read transaction; and in response to the safe-speculative-read transaction, at least when the target data is cached in a second cache associated with a second master device, the coherency control circuitry is configured to return, or request the second cache to return, a safe-speculative-read response while maintaining the target data in the same coherency state within the second cache.

At least some examples provide a master device comprising:

processing circuitry capable of speculative execution of data access operations; and interface circuitry to issue transactions to an interconnect for managing coherency between a cache of the master device and at least one other cache, based on a coherency protocol which assigns one of a plurality of coherency states to each item of data in a given cache;

wherein in response to the processing circuitry speculatively executing a read operation to request target data absent from the cache of the master device, the interface circuitry is configured to issue to the interconnect a safe-speculative-read transaction of a type requesting that the target data is returned to the master device while prohibiting any change in coherency state associated with the target data in said at least one other cache in response to the safe-speculative-read transaction.

Further aspects, features and advantages of the present technique will be apparent from the following description of examples, which is to be read in conjunction with the accompanying drawings, in which:

FIG. 1 schematically illustrates an example of a system having a number of master devices and an interconnect for managing coherency between the master devices;

Figure 1:
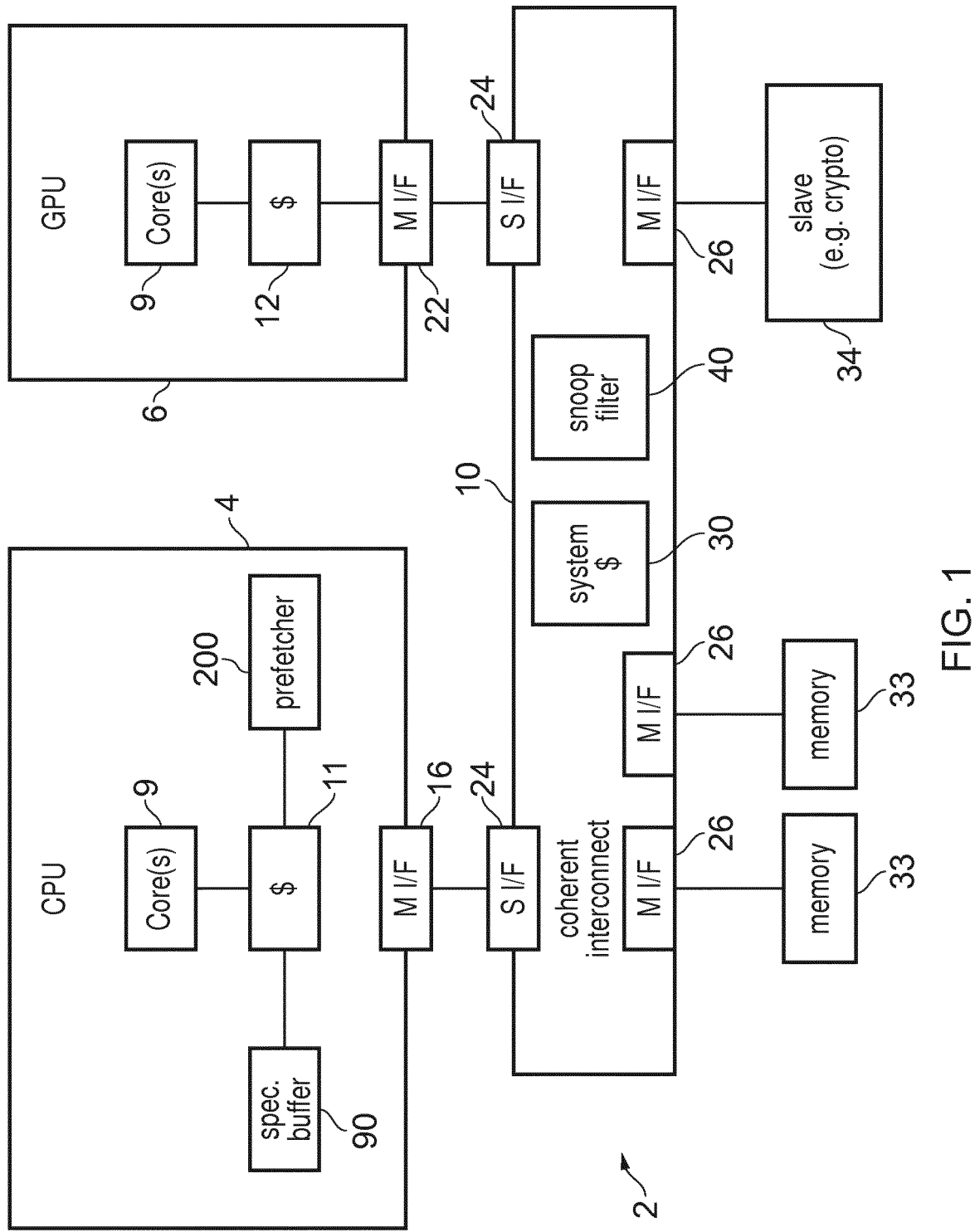

A data processing apparatus may have security mechanisms for ensuring that some secret information is accessible to certain processes running on the data processing system but cannot be accessed by other processes. For example, processes may be allocated a given privilege level and some data may be accessible only to processors having a certain privilege level or higher. Memory protection techniques can be used to enforce the desired memory access permissions.

Recently, it has been recognised that such security measures protecting secret data against unauthorised access could in principle be circumvented by a security attack which exploits the combination of speculative execution and caching which is present in many modern processors. Such attacks exploit the property that the effects of speculatively executed instructions may persist in the cache even after any architectural effects of the speculatively executed instructions have been cancelled. In some variants of the attack, an attacker may train branch predictors or other speculation mechanisms to trick more privileged code into speculatively executing an incorrect sequence of instructions designed to make the privileged code access a pattern of memory addresses dependent on sensitive information, so that less privileged code which does not have access to that sensitive information can use cache timing side-channels (measuring access time for cached addresses) to probe which addresses have been allocated to, or evicted from, the cache by the more privileged code, to give some information which could allow the sensitive information to be deduced. Some mechanisms are available (e.g. partitioning speculative and non-speculative data in the cache) for protecting a master device's own cache against exposing side channel information on changes in cache allocation caused by speculative read operations performed on the same master device.

However, the inventors recognised that it is not only changes in cache allocation in the master's own cache which could be affected by speculatively executed reads. In a system comprising two or more master devices having associated caches, and coherency control circuitry for managing coherency between the caches based on a coherency protocol which assigns one of a number of coherency states to each item of data in a given cache, it is also possible that when a read operation is performed speculatively by one master device, such a read could trigger a change of coherency state associated with data cached in a second master's cache. This change of coherency state at the second master's cache may persist even if the original speculative read operation at the requesting master is subsequently cancelled due to a misspeculation. Even if that change of coherency state at the second master's cache does not cause any data to be evicted or newly allocated to the second master's cache, the change in coherency state could still give rise to differences in the time taken to service read or write requests in the second master device's cache. Such differences in access times in the second cache can be probed by the attacker to deduce information on which address was accessed by the requesting master device which initiated the original speculative read. This could allow a process which does not have access to the secret data, but which does have access to the data whose coherency state changed in the second master's cache, to gain information which could be used to deduce properties of secret data used to derive the address requested by the requesting master device.

In the technique discussed below, the coherency control circuitry may support processing of a safe-speculative-read transaction received from a requesting master device, which is of a type requesting that target data is returned to the requesting master device while prohibiting any change in coherency state associated with the target data in caches of other master devices in response to the safe-speculative read transaction. In response to the safe-speculative-read transaction, at least when the target data is cached in the second cache associated with a second master device, at least one of the coherency control circuitry and the second cache may return a safe-speculative-read response while maintaining the target data in the same coherency state within the second cache.

Hence, by defining a type of read transaction which a requesting master device can issue to guarantee that whatever response is returned, the safe-speculative-read transaction will not trigger a change of coherency state in a cache of another master device, this can mitigate against attacks of the type discussed above. When reads are performed speculatively, then these can trigger the safe-speculative-read transaction as opposed to another form of transaction, so that no change of coherency state occurs at the second master's cache and so this eliminates the opportunity to derive information on what address was requested by the requesting master device based on examining the data allocated in the second cache.

This approach is unusual, since normally a requesting master device would issue a coherency transaction requesting that a certain item of data is returned, and it would be expected that the target data should be returned in a certain coherency state (specified based on the type of transaction), regardless of the coherency state associated with the data in other caches. Such a conventional transaction would require that other caches should trigger any changes of coherency state required in order to ensure that the target data can be returned to the requesting master and cached in the requesting master's cache. In contrast, with the safe-speculative-read transaction, the priority is to ensure that there is no change in coherency state at caches of other master devices, and a response is returned which ensures that this is possible, but it may be left optional whether or not the target data can actually be returned to the requesting master device and/or in what coherency state the data is returned. Whether it is possible to return the target data could depend on what coherency state is associated with the target data if it is cached in another master's cache. Hence, rather than returning a known coherency state at the requesting master device and enforcing any required change of coherency state at the second cache, the safe-speculative-read transaction ensures that the coherency state at the second cache remains the same, but can lead to different outcomes at the requesting master device.

Different implementations may respond to the safe-speculative-read transaction in different ways.

In one example, in response to the safe-speculative-read transaction, when the target data is cached in the second cache in a coherency state which would not permit caching of the target data in the requesting cache without changing the coherency state of the target data in a second cache, the coherency control circuitry or the second cache may return a no-data response which indicates that the target data cannot be provided by the second cache until a speculative read operation which triggered the safe-speculative-read transaction is resolved as non-speculative. With this approach, if the current coherency state of the target data in the second cache cannot accommodate also caching the target data in the requesting cache, then a response is provided indicating that it is not currently possible to provide the target data to the requesting master devices cache, and so in this case the requesting master does not receive the target data in response to the safe-speculative-read transaction.

With this implementation, if the requesting master device receives the no-data response, then the requesting master device may wait until the speculative read operation which triggered the safe-speculative-read transaction has been resolved as correctly speculated, and then may issue a further transaction to the coherency control circuitry which is of a type requesting that the target data is returned to the requesting cache while permitting a change of coherency state associated with the target data in other caches. At this point, changes of coherency state in other caches may be safe because the original read is no longer speculative and so security attacks based on changes in cache states caused by incorrectly speculated read operations would no longer be a risk (if the original speculation was incorrect, continued processing based on the speculation would be cancelled so that the further transaction would not be issued).

In an alternative approach, instead of returning an indication that the target data cannot be provided when the current coherency state of the target data in the second cache would not permit caching of the target data in the requesting cache, the safe-speculative-read response could instead comprise a non-cacheable read response which does provide the target data to the requesting master device, but which prohibits the requesting cache from caching the target data. This can allow the speculatively performed read operation to use the target data that was returned from the second cache as the result of that particular operation, but then this returned data could be discarded without being cached to avoid needing to provide any change of coherency state in the second cache. Again, this prevents the opportunity for attackers to gain information on secret data based on side channel information derived from changes in coherency state triggered by incorrectly speculated read operations.

In some implementations, although the non-cacheable read response may prohibit the target data from being cached in the requesting master device in a coherent manner compliant with the coherency protocol, the requesting master device may still have a non-coherent speculative buffer for buffering data associated with speculative read operations while the speculative read operations remain speculative, and in response to the non-cacheable read response the returned target data could be allocated into the speculative buffer. This could allow further instructions executed after the original speculative read to carry on using the returned target data if desired. However, coherency would not be maintained between the data in the speculative buffer and the data in the second cache, to avoid needing to trigger a change of coherency state in the second cache.

If data is retained in such a speculative buffer outside the control of the coherency scheme, then once the speculative read operation which triggered the safe-speculative-read transaction is resolved as correctly speculated, the requesting master device may issue a coherent upgrade request to the coherency control circuitry to request upgrading of a non-coherent version of the target data in the speculative buffer to a coherent version of the target data. For example, the coherent upgrade request could be a request that the latest version of the target data is returned to the requesting master device (e.g. using a coherency-change-permitting transaction which is allowed to trigger changes of coherency state at other master's caches). If the target data is still cached in the second master device's cache then it may be returned from the second cache, or alternatively by the time the speculative read operation was resolved the second cache may no longer hold the data and the data may need to be fetched from another location. By issuing a request to refetch the target data once the speculative read operation is resolved then this enables any subsequent changes of the target data held in other locations to be made available to the master device so that the master device does not continue to use potentially out of date information. Once the refetched data has been returned then the requesting master device could then allocate this data into its requesting cache, rather than in the speculative buffer, and cancel the speculative buffer entry. Alternatively, the coherent upgrade request could be a request for an indication of whether the data has changed since the non-cacheable response was received. For example, the coherency control circuitry and/or the second cache could track whether any write to the target data has occurred since the non-cacheable response was provided, and if so inform the requesting master device to trigger cancelling of the speculative buffer entry and refetching of the up to date data.

After allocating the target data to the non-coherent speculative buffer, in response to determining that a change to the target data since the target data was provided by the non-cacheable read response would cause incorrect execution, the requesting master device may cancel subsequent operations speculatively executed based on the target data provided by the non-cacheable read response. This ensures that the subsequent operations which used potentially incoherent copies of the target data (which were not updated following changes to the target data in other cache locations) are cancelled to prevent incorrect results. The detection of whether a change to the target data would cause incorrect execution may for example comprise determining if the instruction which triggered the speculative read transaction has been reordered with respect to any other instructions reading or writing the target data, or any barrier instructions.

Hence, although the coherency protocol may require that the non-cacheable read response prohibits caching of the return data in a coherent manner within the requesting master devices cache, it is possible at a micro-architectural level to buffer this data outside the protection of the coherency scheme, but in this case then when the data becomes non-speculative then a mechanism may be provided to check whether any subsequent changes to the data have been made since the data was allocated to the speculative buffer (e.g. refetching the data and comparing with the previously fetched value to check whether later speculative operations could potentially have used incoherent data), before allocating any coherent version of the data into the requesting master device's cache.

In implementations where the safe-speculative-read transaction triggers the non-cacheable read response as discussed above, in some cases the safe-speculative-read response may always comprise a non-cacheable read response regardless of the coherency state of the target data in the second cache. In this case, even if the target data misses in the second cache and has to be fetched from a further cache or main memory or if the target data is held in the second cache in a coherency state which would have permitted the target data to also be cached in the requesting cache of the requesting master device in a coherent manner, the non-cacheable read response could still be returned so as to prohibit coherent caching in the requesting cache. This means the same response is returned to the requesting master device regardless of what particular coherency state was associated with the target data in the second cache, which may be simpler to implement.

Alternatively, the non-cacheable read response could be returned in the case when the target data was cached in the second cache in a coherency state in which caching of the target data in the requesting cache would not be permitted without changing the coherency state at the target data in the second cache. However, if in response to the safe-speculative-read transaction, the target data is cached in the second cache in the coherency state in which caching of the target data in the requesting cache would be permitted by the coherency protocol without changing the coherency state in the second cache, then in this case the safe-speculative-read response could instead comprise a cacheable read response which provides the target data and permits the requesting cache of the requesting master device to cache the target data in a coherent manner. While this approach may result in different responses depending on the coherency state in the second cache, it means that when the coherency state does permit caching in the requesting cache then the data can be retained coherently at the requesting master device so that instructions subsequent to the speculative read can continue to use the data while complying with the coherency scheme, potentially improving performance and eliminating the need for safeguards to check coherency once the speculation has been resolved.

Similarly, in embodiments where the no-data response is returned when the target data is cached in the second cache in a state which does not permit caching in the requesting masters cache, the cacheable read response could be returned when the target data is cached in a coherency state which does permit caching in the requesting cache.

For all of the above examples of the safe-speculative-read transaction and the corresponding safe-speculative-read response, when the target data is absent from the other caches managed according to the coherency protocol, the coherency control circuitry may obtain the target data from a further level cache or a memory shared between the plurality of master devices. That is, the safe-speculative-read transaction can initiate a linefill operation to obtain the target data from a further level cache or memory and allocate the target data into a given cache without needing to wait for any speculative operation which triggered the safe-speculative-read transaction to be resolved. This is an advantage of implementing the safe-speculative-read transaction (as compared to an alternative technique in which instead a standard read transaction was used but to ensure no coherency state change is triggered in other caches, the issuing of the read transaction was delayed until any speculation associated with the read had been resolved and it was known for sure that the read was correctly speculated). If no transaction at all was issued until the read was resolved as correct, then in the event that no cache currently holds the target data, the linefill request would have to be deferred until the speculation has been resolved. As the linefill operation is typically much slower than accessing the data from a cache, delaying the linefill request could cause a significant reduction in performance. In contrast, with the safe-speculative-read transaction, while obtaining target data from another cache may sometimes need to be delayed in order to ensure that coherency state does not change in the other cache as a result of a still-to be resolved speculative access, the longest latency operations to a further level cache or main memory can still be initiated early using the safe-speculative-read transaction. This helps to improve performance.

It will be appreciated that the safe-speculative-read transaction may not be the only type of read transaction supported. The requesting master device may tend to use the safe-speculative-read transaction when executing speculative read operations at least to data considered potentially sensitive. However other types of read transaction could be implemented for use in non-speculative read operations or speculative read operations to data known not to be sensitive. Such other types of read transaction could return the target data while permitting changes in coherency state in another master device's cache. On the other hand, for some implementations all reads (speculative or non-speculative) could trigger the safe-speculative-read transaction. This could be more efficient especially in systems where most, if not all, reads are performed speculatively and it cannot safely be determined whether data is considered sensitive or not. Hence, in general the provision of support for the safe-speculative-read transaction can be useful to guard against the risk of side-channel attacks, but exactly which read operations trigger the safe-speculative-read transaction or another type of read transaction can vary from implementation to implementation.

As well as caches associated with particular master devices, the system may also include one or more shared caches which are shared between the master devices. A shared cache may be accessed on request by one of a number of requesters, where each request either comprises a given master device or a given process executed on a given master device. In some cases, different processes on the same master device could be identified as separate requesters. Such shared caches may again give rise to potential opportunities for speculation side-channel attacks. To improve performance, it may be desirable that one requester can access data allocated by a different requester once that data has been allocated non-speculatively. However, for speculatively allocated data, if one requester could access the data speculatively allocated by another requester while that data remains speculative, then this could allow an attacker to control one requester which does have access to secret information to allocate data to the cache following an incorrectly speculated read to an address which depends on the secret information, and then another requester would be able to determine from shared cache access timing information which address was allocated and hence derive information about the secret. This would be undesirable.

A technique for addressing this problem may be to operate the shared cache so that the allocating requester which caused the data to be speculatively allocated for the shared cache is tracked. In response to a request to read data which was speculatively allocated to the shared cache by an allocating requester, while an operation triggering allocation of the data remains speculative, the shared cache may return a miss response indicating that the data is not cached in the shared cache when the request is triggered by a requester other than the allocating requester. Hence, while the allocating requester itself may hit against the speculatively allocated data and so can benefit from the performance gains associated with caching this information in the shared cache, other requesters cannot yet see the data until any speculation is resolved and it is determined that the data has been correctly allocated. This avoids attackers being able to gain side-channel information for incorrect speculative allocations in the shared cache.

In other words, in response to a request by a given requester to read target data speculatively allocated to the shared cache by an allocating requester, while an operation triggering the speculative allocation of the data remains speculative, the shared cache may return a hit response providing the target data when the given requester is the allocated requester, and return a miss response indicating that the data is absent from the further level cache when the given requester is a requester other than the allocating requester.

In the case of returning the miss response when hitting against speculative data allocated by a different requester, if the data speculatively allocated to the cache is dirty, then the cache may also write back the dirty data to a further level cache or memory, either before returning the miss response or in parallel with returning the miss response.

The further level cache or memory may have a mechanism for distinguishing speculative and non-speculative data so that the speculative data can be identified and discarded if the corresponding speculative operation was determined to have been incorrectly predicted. The shared cache may also ensure that if data is speculatively fetched into the shared cache from a further level cache or memory, it is obtained in a clean state, so that there is no need to write the data back to the further level cache or memory in the event that the speculation turns out to be incorrect.

The shared cache could be implemented in different ways. In one example the shared cache may have a speculative cache region and a separate main cache region. The speculatively allocated data can be stored in the speculative cache region, while non-speculatively allocated data may be stored in the main cache region. The speculatively allocated data could be transferred to the main cache region in response to an indication that the operation triggering allocation of the data has been resolved as non-speculative by the allocating requester. Although in some cases the resolution of each speculative operation could be signalled individually to the shared cache in order to trigger the promotion of the speculatively allocated data to the non-speculative main cache region, this may result in a large amount of communication with the shared cache. It may be more efficient to associate each cache entry with a certain group of speculatively executed operations and then once each of the operations in the group have been resolved correctly then this could trigger the transfer of any entries associated with operations in that group from the speculative cache region to the main cache region.

In another example, a single speculative cache region in the shared cache could be shared amongst all of the requesters. In this case each entry of the speculative cache region could additionally specify metadata identifying which requester was the allocating requester, so that it can be controlled whether a request from a given requester should be treated as a hit or a miss. Alternatively, a number of different separate speculative cache regions could be provided each corresponding to a given requester, and in this case requests from a given requester may hit only in the speculative cache region that is dedicated to the particular requester.

Alternatively, both speculative and non-speculative data could be cached within the same region of the shared cache. In this case the shared cache may store metadata associated with each item of data in the shared cache indicating whether the data remains speculative, and if the data remains speculative, indicating which requester is the allocating requester. In this case the resolution of a given operation or group of operations as correctly speculated could then trigger updating of the metadata associated with items allocated by that operation or group of operations to indicate that the data is now non-speculative.

In cases where metadata is used to distinguish which entries relate to each requester, a partitioning scheme could still be applied to limit the maximum number of entries that can be allocated to a given requester for storing speculative data, or the sizing of the shared region chosen to be large enough that conflict for cache entries is less likely. This can be useful to reduce the likelihood of one requester evicting another requester's speculative data, which could otherwise risk leaking timing information.

In the case where a second requester may perceive a cache miss in the shared cache even though a first requester may have allocated speculative data to the shared cache, some implementations may allow the second requester to also allocate a second entry for the same address. In this case, some additional tracking information can be assigned to one or both of the entries associated with the first and second requesters, so that when the speculation is resolved then the separate entries can be coalesced into a single entry while maintaining coherence. Alternatively, other implementations may reduce the complexity of handling separate entries for the same address in the shared cache, by requiring that, when a given entry is promoted from speculative to non-speculative upon resolution of the speculation, any additional speculative entries for the same address are invalidated.

Another area which attackers could exploit based on speculative side channels could be the presence of a data prefetcher for speculatively prefetching data into a cache based on prefetch addresses predicted based on addresses of data access operations previously executed by the processing circuitry. For example the data prefetcher could have circuitry to predict the prefetch addresses based on monitoring of previously accessed addresses, for example to detect whether addresses are being executed with a given stride pattern (a sequence of addresses with a regular offset between successive addresses). An attacker may be able to control the operations of a given processor so that the stride pattern executed depends in some way on secret information, e.g. if the base address from which the stride started, or the offset between successive addresses, depends on part of the secret. Hence, a data prefetcher trained on the addresses of the speculatively executed instructions could leak information by revealing in the base address or data stride.

In one technique discussed below, a system having a cache and a data prefetcher may be controlled so that the cache and data prefetcher prohibit data, which is speculatively prefetched by the data prefetcher based on prefetch addresses predicted based on previously accessed addresses of speculatively executed data access operations, from triggering an eviction of non-speculative data from the cache. This can be achieved in different ways.

In one example the data prefetcher may predict the prefetch addresses exclusively based on the previously accessed addresses associated with data access operations already resolved as correctly speculated by the processing circuitry. By training the data prefetcher solely based on the correctly calculated addresses of resolved data access operations, not based on addresses which are still speculative and could be incorrect, this means that incorrectly accessed addresses do not affect future prefetch predictions, reducing risk of the data prefetcher leaking information.

An alternative approach may be to provide a cache comprising a main cache region and speculative cache region. The cache in this case may be arranged to allocate data prefetched by the data prefetcher to the speculative cache region, and once it has been determined that the prediction of the prefetch address for a given item of data was correct then the cache may transfer that given item of data to the main cache region. With this approach it is possible to train the data prefetcher based on addresses of still to be resolved speculative memory accesses, but by avoiding polluting the main cache region based on speculative accesses until it is known they are correct, this prevents any non-speculative data being evicted by speculatively prefetched data, so that an attacker cannot gain information on which data addresses were prefetched based on analysis of contents of the main cache region. The contents of the speculative cache region may be accessible to further data access operations while the processor remains in the same operating state in which the speculative data was allocated. However, data allocated to the speculative cache region may be discarded in response to an event representing a change of state which could potentially indicate a transition to code which would not have access to some data which was accessible prior to that event (e.g. the event could be an exception, a change of privilege level, a change of security mode, etc.), so that a transition from the more privileged code to the attacker's less privileged code for example would make inaccessible the previously speculatively prefetched data which has not yet been confirmed as correct.

Hence regardless of which of these approaches is taken for the prefetcher, by eliminating the option to evict non-speculative data from the cache as a result of prefetching of data from addresses which were predicted based on previously accessed addresses of speculatively executed data access operations which are not yet known to be correct, this reduces the scope for speculation side-channel attacks of the type discussed above.

FIG. 1 schematically illustrates an example of a data processing system 2 (e.g. an integrated circuit or system-on-chip) which includes a number of master devices 4, 6 and an interconnect 10 for managing coherency between the master devices and other caches. In this example the master devices include a central processing unit (CPU) 4 for performing general purpose processing and a graphics processing unit (GPU) 6 for performing graphics processing. The CPU and a GPU include caches 11, 12. Some masters may have more than one cache, e.g. level 1 caches associated with particular cores 9 and a level 2 cache shared between cores (for conciseness a single cache per master is shown in FIG. 1). Each of the master devices 4, 6 has a coherency interface 16, 22 for interacting with the coherent interconnect. For example, the coherency interface 16, 22 may be responsible for generating the required coherency protocol transactions in response to cache accesses from the relevant master, and responding to snoop requests from the interconnect 10 with appropriate responses and changes of coherency state. It will be appreciated that this is just one example of some master devices and other types of masters could also be provided, such as network interface controllers for controlling data transmission and reception over a network, display controllers for controlling display of data on a screen, or a DMA (direct memory access) controller for controlling transfer of data between memory and a peripheral device for example. Examples of coherency protocols which could be used are the AMBA® 4 ACE and AMBA® 5 CHI coherency protocols provided by Arm® Ltd of Cambridge, UK, but it will be appreciated that the techniques discussed herein could also be applied to other coherency protocols.

The coherent interconnect 10 comprises a number of slave interfaces 24 for communicating with the coherency interfaces 16, 22 of respective master devices 4, 6, and a number of master interfaces 26 for communicating with slave devices such as memory 33 or a cryptographic unit 34 for providing cryptographic support to operations performed on the master devices. In this context, a slave interface 24 is an interface which acts as a slave (responds to transactions rather than initiating the transactions) in the bus protocol being used (such as the AMBA® protocols discussed above). Hence, the interface 24 which communicates with the master devices 4, 6 is a slave interface because it responds to transactions initiated by a corresponding master interface 16, 22 at the master device 4, 6. Similarly, a master interface 26 is an interface which acts as a master in the bus protocol, being responsible for initiating transactions to which a corresponding slave interface will respond. Hence, the interfaces 26 of the interconnect 10 that communicate with slave devices 33, 34 are master interfaces. Although not shown in FIG. 1, some devices could communicate with the interconnect 10 over both master and slave ports. The coherent interconnect 10 may comprise a system cache 30 shared between master devices. The system cache 30 provides faster access to data than if the corresponding data had to be fetched from main memory 33.

As shown in FIG. 1, the coherent interconnect 10 may include a snoop filter 40 for tracking which data addresses are cached at certain master devices 4, 6. The snoop filter 40 can be used to reduce snoop traffic by allowing the coherent interconnect 10 to determine when data is not cached at a particular master. The snoop filter 40 is not essential, and in some embodiments may provide an interconnect 10 which does not attempt to track the data cached at each master. In this case, when one master 4, 6 issues a read or write transaction to data which could be shared with other masters, the coherent interconnect 10 may trigger snoop transactions to be issued to each other master which could have a cached copy of the data from the same address, and manage changes in coherency state at those other masters and/or responses to the requesting master with more up to date versions of the data as necessary. However, if there are a lot of masters, then this approach of broadcasting snoops to all cached masters can be complex and result in a large volume of coherency traffic being exchanged within the system 2.

By providing a snoop filter 40 which can at least partially track which addresses are cached at the respective masters, this can help to reduce the volume of snoop traffic. In some cases the snoop filter 40 may precisely track the data stored in each master's cache, so that the coherent interconnect 10 can determine exactly which data is cached where. Hence, when a transaction is received from an initiating master directed to potentially shareable data then the interconnect 10 can determine from the content of the snoop filter 40 which other masters are caching data from the same address and send snoop transactions to those masters indicated in the snoop filter, avoiding the need to send snoops to other masters which are not currently storing the data.

However, other snoop filters may not track the content of the caches precisely. For example, a filter scheme may be used which ensures that the snoop filter 40 avoids false negatives, ensuring that any data which is present in the caches 11, 12 is logged as present in the snoop filter, but which permits some false positives, so that sometimes the snoop filter 40 may indicate that data is cached in a given master, but actually the master has already invalidated the data. This approach of allowing some imprecision can reduce the overhead of updating the snoop filter as it means that not every invalidation from the master's cache 11, 12 has to be reflected at the snoop filter.

In some cases, the system cache 30 and snoop filter 40 could be combined. For example, if the system cache 30 acts as an inclusive cache which caches all addresses cached by any of the master's caches 11, 12, then each cache entry could specify additional metadata identifying which caches have cached which addresses, so that the coherent interconnect 10 can determine whether data is cached at a particular master from the system cache 30 without needing to snoop the master.

FIG. 2 shows an example of processing a coherency-change-permitting read transaction. This is a type of read transaction which cannot be guaranteed not to expose secret information through changes in coherency state at other caches, and so may not be safe to be used in response to some speculative read operations. The read transaction specifies a target address and returns target data associated with that address to the requesting master 4, 6 which issued the request. In the examples below it is assumed that the requesting master which issued the request is the CPU 4 and the second master which is snooped based on the request is the GPU 6, but it will be appreciated that this could be the other way round.

Figure 2A:
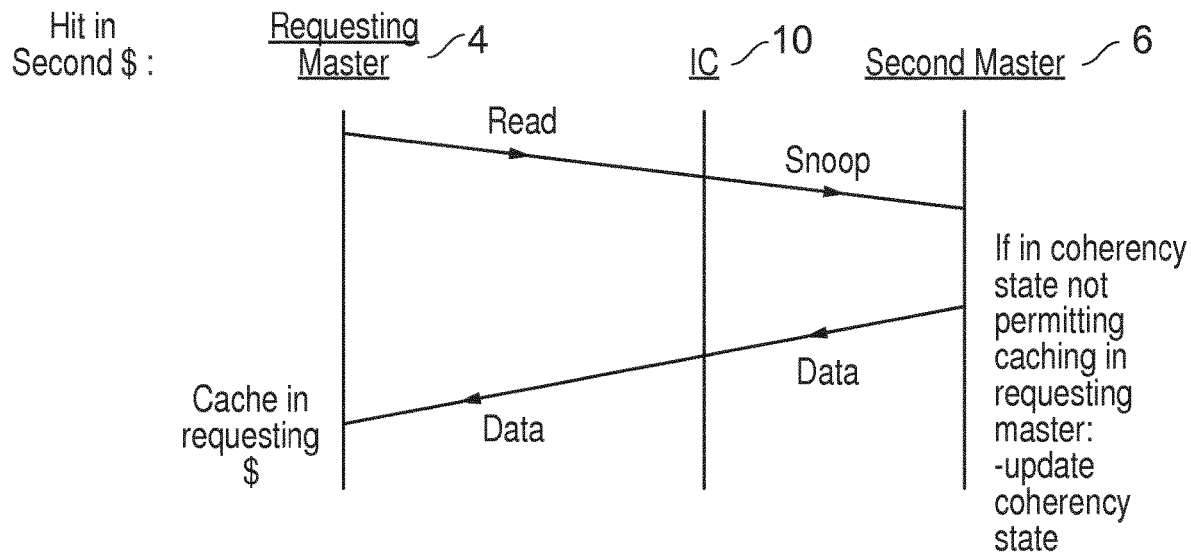
FIGS. 2A and 2B illustrate processing of a type of read transaction requesting the return of target data to a requesting cache while permitting changes of coherency state in other caches.

FIG. 2A illustrates an example where the read transaction results in a hit in the second cache 12 of the second master 6. Hence, when the requesting master 4 issues the coherency-change-permitting read transaction, the interconnect 10 issues a snoop request to the second master 6. In response, the second master looks up the target address in its cache and determines that it holds the target data in a valid state. If the current coherency state of the target data in the second master's cache would not permit the target data to be simultaneously cached in the cache 11 of the requesting master 4, then the second master's cache changes the coherency state of the target data in the second cache 12 to a state consistent with the data being cached at the requesting master.

For example, the coherency protocol could define, for a given cache, one of the following coherency states for each cache line:
  Modified (the cache holds the only valid copy of the cache line, and has modified the data);
  Exclusive (the cache has the only valid copy of the cache line, and the data is clean);
  Shared (the cache holds a valid copy of the cache line, but this cache does not have the right to modify the data, other caches may or may not also hold valid copies); and
  Owned (the cache holds a valid copy of the cache line, which is dirty, and so this cache will need to write back the data to memory if the cache line is evicted, other caches may or may not also hold valid copies);
  Invalid (the cache does not hold a valid copy of each cache line).

For example, if the coherency state of the snooped target data was Exclusive or Modified then in order to cache the data at the requesting master this may require a downgrade of the coherency state in the second master's cache 12 to Shared or Owned. The particular coherency state transition triggered by the read transaction may depend on the particular coherency protocol being used (it will be appreciated that the MOESI protocol described above is just one example). In any case, regardless of the coherency state of the data that was snooped in the cache 12 of the second master 6, the data is returned via the interconnect 10 to the requesting master 4 and then the requesting master caches the returned data in its cache 11.

Figure 2B:
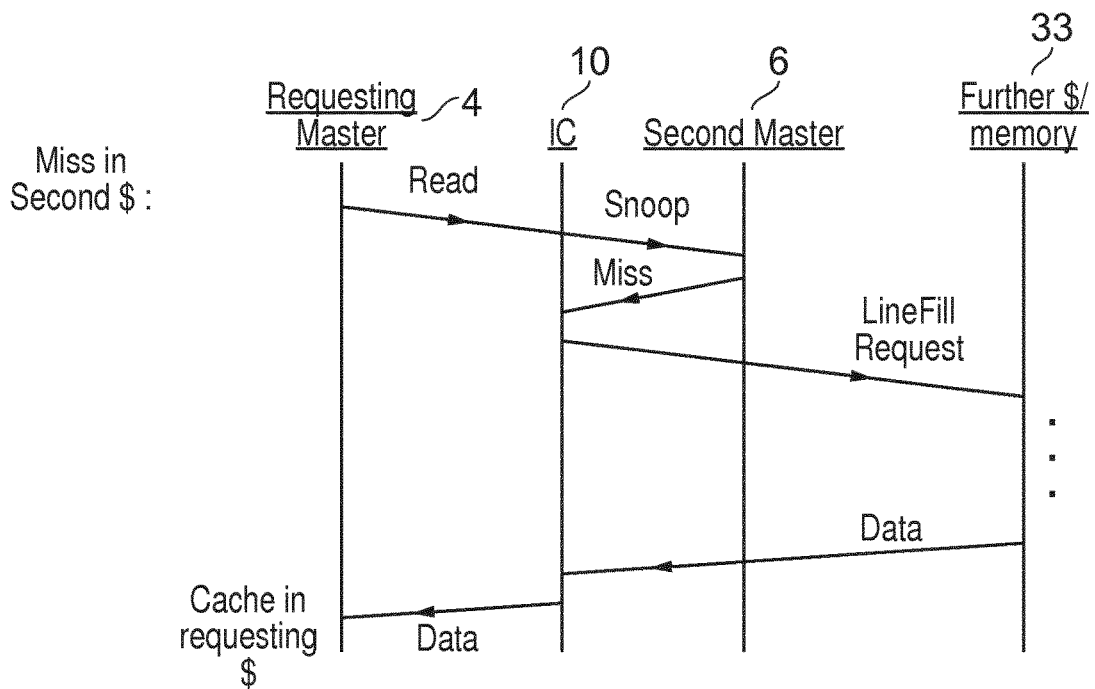

FIG. 2B shows the response to the coherency-change-permitting read transaction when the request misses in the second master's cache 12 (and also misses in any other master's cache managed by the coherent interconnect). In this case when the second master 6 is snooped by the interconnect 10, the second master returns a miss indication indicating that the data was not present in the cache 12 of the second master 6, which triggers the coherency control circuitry (interconnect) 10 to issue a linefill request to a further cache or main memory 33. In some cases if the snoop filter 40 indicates that the data is not present in the second masters cache then there may be no need to actually snoop the second master 6 and receive the miss indication, and instead the interconnect 10 can trigger the linefill request directly in response to the read transaction received from the requesting master 4.

Hence, if the read transaction misses in all other caches managed by the interconnect 10, then the line fill request is triggered to fetch the data from a further cache (e.g. a system cache in a downstream interconnect or memory controller), or from memory 33. The linefill request may take longer to service than if the data had been available in one of the master's caches. Eventually the further cache or memory returns the data to the interconnect and then the data is provided to the requesting master 4 and cached in the requesting master's cache 11.

Hence, regardless of whether the request hits in a master's cache or misses, with the coherency-change-permitting read, the requesting master 4 always obtains the data and caches it in its own cache. If necessary, a change in coherency state may be triggered at other masters caches to permit the requesting master to cache the data. It will be appreciated that the example of a read transaction shown in FIGS. 2A and 2B is just one type of read transaction that could be supported, and the coherent interconnect 10 could also support other types of read transactions which may be processed in a different manner to that shown in FIGS. 2A and 2B, but which can potentially lead to a change of coherency state at the second master's cache 12.

The CPU 4 or GPU 6 or other masters may support speculative execution of instructions including instructions which can trigger read operations to read data from memory. Speculative loads executed in a trusted application can leak data to untrusted applications using cache timing side channels. One example of such a side-channel attack was described in the "Spectre" attack. The attack uses the following (or similar) code sequence:

```
unsigned long untrusted_value = ...;
if (untrusted_value < arr1->length) {
    unsigned char secret = arr1->data[untrusted_value];
    unsigned char value2 = arr2->data[secret * 64];
}
```

If the CPU mis-speculates the "if" condition (mechanisms to induce mis-speculation include malicious training of branch predictors, and/or supply of an out of bounds array index), the CPU speculatively fetches the first value from memory and potentially the second value. By using a cache side channel, it is possible to infer the value of secret since the cache set used by the second access is data dependent and can be detected using a simple timing side channel. Such side-channels can be exploited by probing the local cache hierarchy or by probing the coherence effects associated with the speculative access.

The condition in the example above will always be false when trying to extract the secret value since this resides outside of the bounds of the first array, i.e., the access will never become non-speculative. If speculative state is never allowed to affect non-speculative state, the timing side-channel above would become ineffective. For caches, speculative loads can affect non-speculative state by installing and evicting cache lines irrespective of their speculative/non-speculative state; in particular, influencing non-speculative lines measurably by speculative lines. One way to achieve such isolation is with the following properties:
  Speculative access should be installed in an isolated part of the cache and should not be allowed to evict non-speculative cache lines or speculative cache lines from other masters, or visibly (through timing) affect their state.

A load retiring (or becoming non-speculative earlier) promotes a speculative cache line to a non-speculative cache line.

Hardware prefetchers should be treated as speculative accesses; or train on promotions rather than speculative accesses to avoid side-channels.

For example, for a cache in a single-core, a speculative region can be added, dedicated to speculative data and separate from the main cache region. A cache line in the speculative region is promoted to a non-speculative cache line when a load retires and is invalidated if the load is squashed. Upon promotion, the speculative cache line evicts a non-speculative cache line if needed and that line is invalidated. The speculative region of the cache may be cleared on context switches/system calls (which falls out from the squashing of the loads described earlier) or a speculation barrier. The core may also clear speculative lines when rolling back a miss-speculated branch if configured to do so (this provides a stricter guarantee that protects an application from untrusted code).

Figure 3:
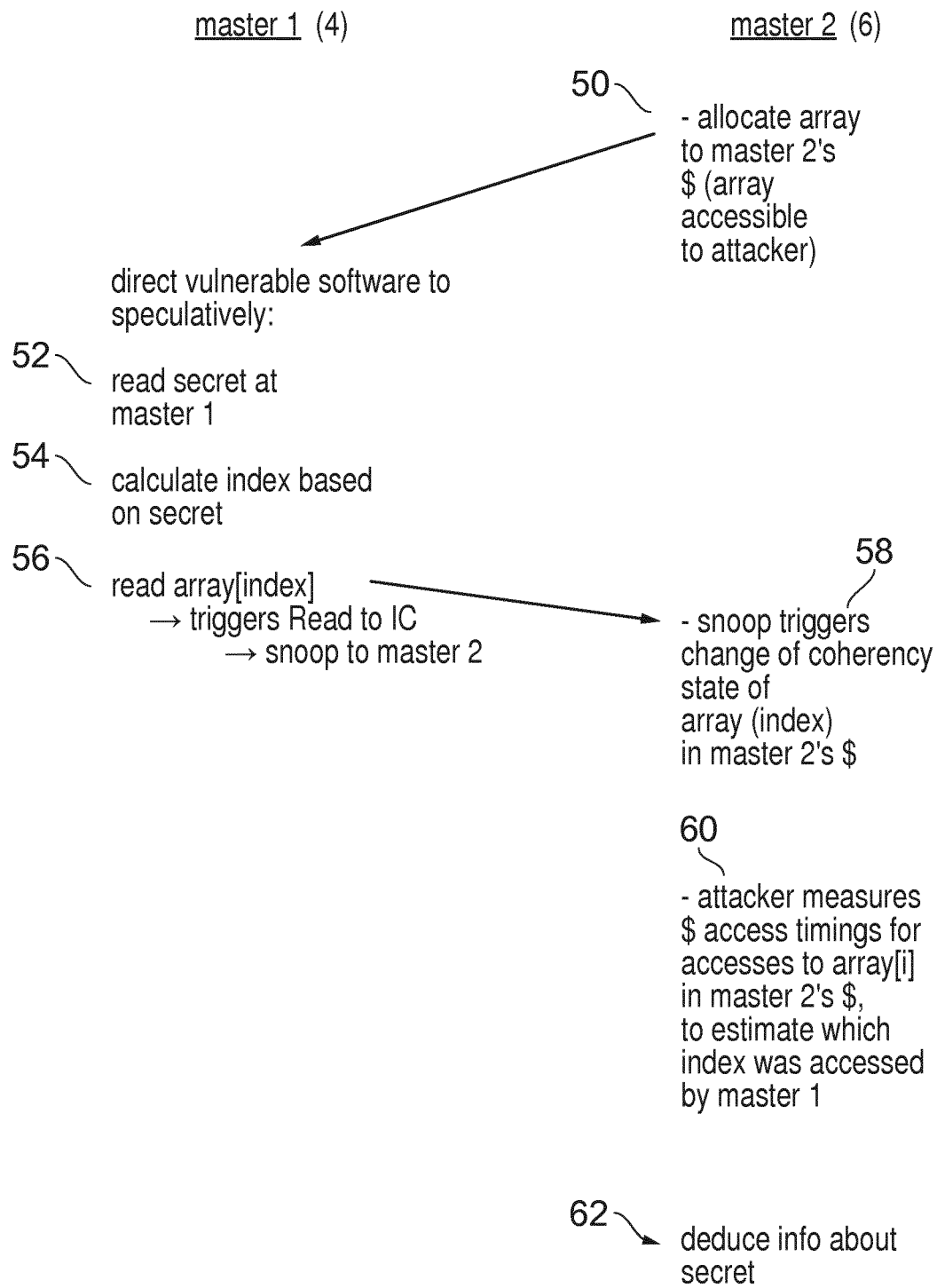
FIG. 3 shows an example of a potential security attack which could derive information on secret data based on changes on coherency state in another cache.

However, side-channel information useful to attackers could also be leaked through changes in coherency in one master's cache triggered by a speculative read operation on another master. That is, the type of read transaction shown in FIGS. 2A and 2B could leak such secret information, as the attacker can use cache timing side channels to probe the change in coherency state in the second master 6 which could be triggered by the read transaction as shown in FIG. 2A. FIG. 3 shows an example of how such an attack could be made by an attacker who can control the processing performed on a first master, e.g. the CPU 4, and a second master, e.g. the GPU 6 in a system having a coherent interconnect for managing coherency as discussed above.

As shown in FIG. 3, at step 50 the attacker controls the second master 6 to allocate into its cache 12 an array of data which is accessible to the attacker. The array allocated into the second master's cache need not be any array containing secret information, but is simply allocated into its cache to enable detection of changes based on the secret.

At step 52, the attacker directs vulnerable software executing on the first master 4 to read the secret information. The vulnerable software may for example be more privileged software which does have access to the secret that is not directly accessible to the attacker himself. For example, the attacker may use malicious training of branch predictor state or supply an out-of-bounds array index to the vulnerable software in order to fool the vulnerable software into reading the secret while waiting for the bounds checking operation to be resolved. This can make the vulnerable software access the secret when it should have been accessing other data. It will be appreciated that there are a range of ways in which the attacker could ensure that the vulnerable software reads the secret.

At step 54 the attacker may direct the vulnerable software to calculate an index based on the secret (or on a subset of bits of the secret), and at step 56 the vulnerable software is caused to read the array which was previously allocated to the second masters cache at step 50, with the read element of the array selected based on the index calculated at step 54. The read at step 56 may trigger a read transaction to be issued to the coherent interconnect 10 as shown in FIG. 2A and hence a snoop request issued to the second masters 6. At step 58 the snoop request may then trigger a change of coherency state of the target data (indexed element of the array) in the second masters cache 12.

At step 60, the attacker can then measure cache access timings for accesses to different elements of the previously allocated array in the second master's cache 12 to estimate which element was accessed by the first master. For example, if the array was previously allocated in an exclusive state where the second master 6 is the only master which holds valid copies of the data, and the read transaction from the first master 4 then causes the indexed element to transitions to a non-exclusive state in which permission to modify the data is required, then a write access to the indexed element could be serviced slower than accesses to other elements of the array. Even if a single attempt at such an attack is not sufficient to identify the exact index accessed by the first master 4, this could be repeated several times to use statistical methods to deduce the accessed index. Hence, at step 62 some information can be deduced about the secret from the cache access timings in the second master's cache.

This form of attack is possible because the speculative operations at steps 52 to 56 are allowed to trigger a change of coherency state in another master's cache even though it is not yet known whether these operations have correctly been performed. In practice, the way in which the attacker would be able to control master 1 to performs steps 52 to 56 would be to rely on incorrect speculation so that the master 1 temporarily performs its operations but then subsequently detects that these operations were incorrect and rewinds the architectural effects of these operations. Nevertheless, if there has been a change of coherency state in master 2's cache due to these operations, then this effect would persist even when architectural effects of the speculatively executed operations had been cancelled at master 1.

Figure 4A:
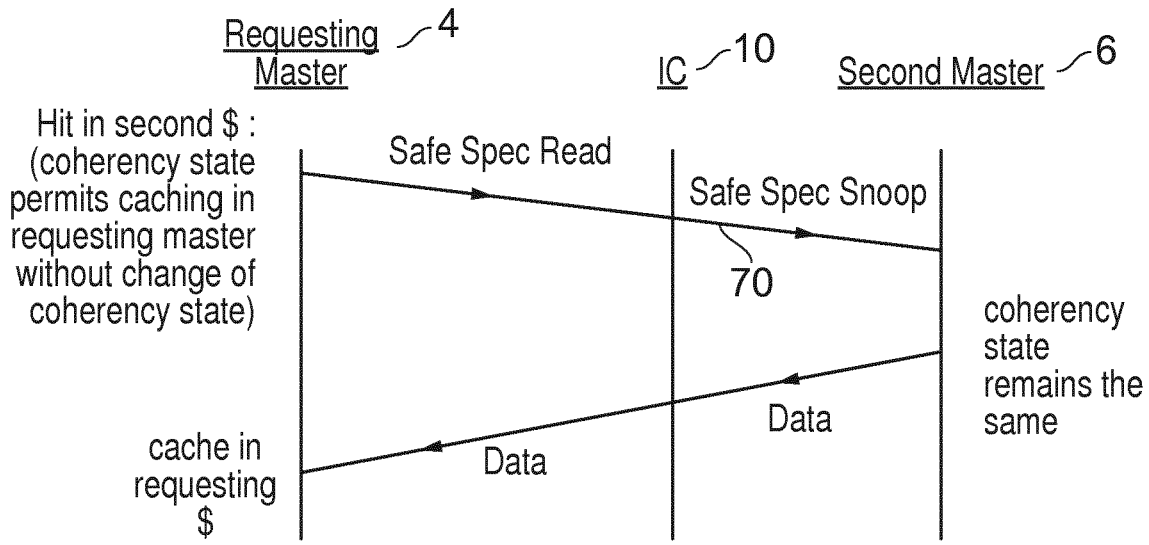
FIGS. 4A to 4C illustrate processing of a safe-speculative-read transaction which guarantees that the transaction will not trigger a coherency state change in another cache while the read operation which triggered the transaction remains speculative.
Figure 4B:
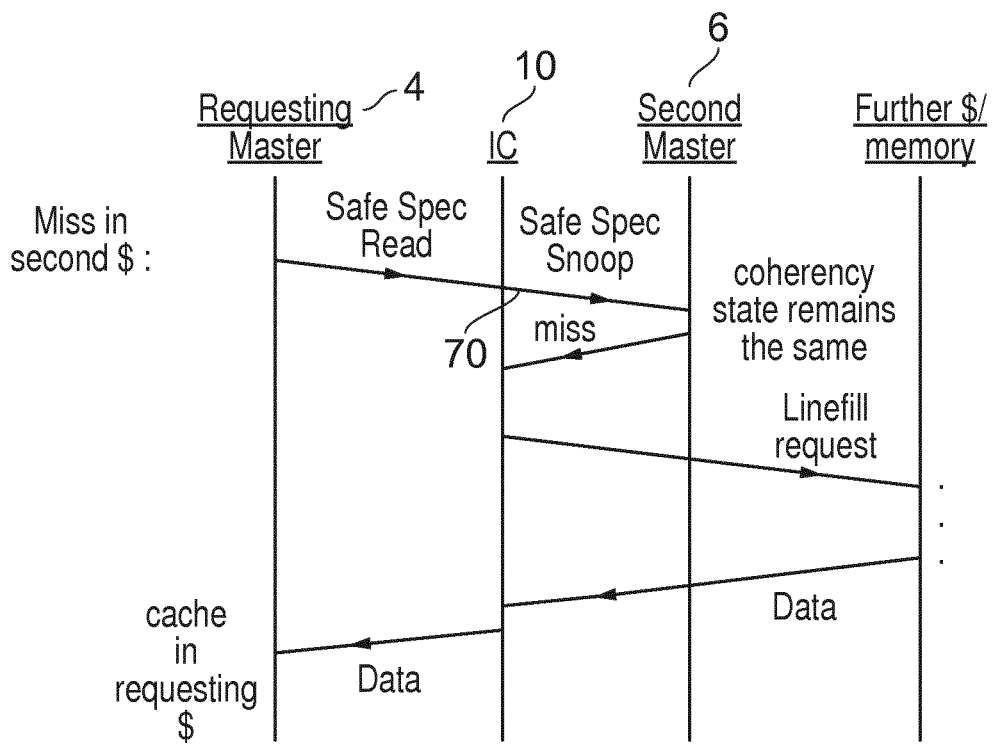
Figure 4C:
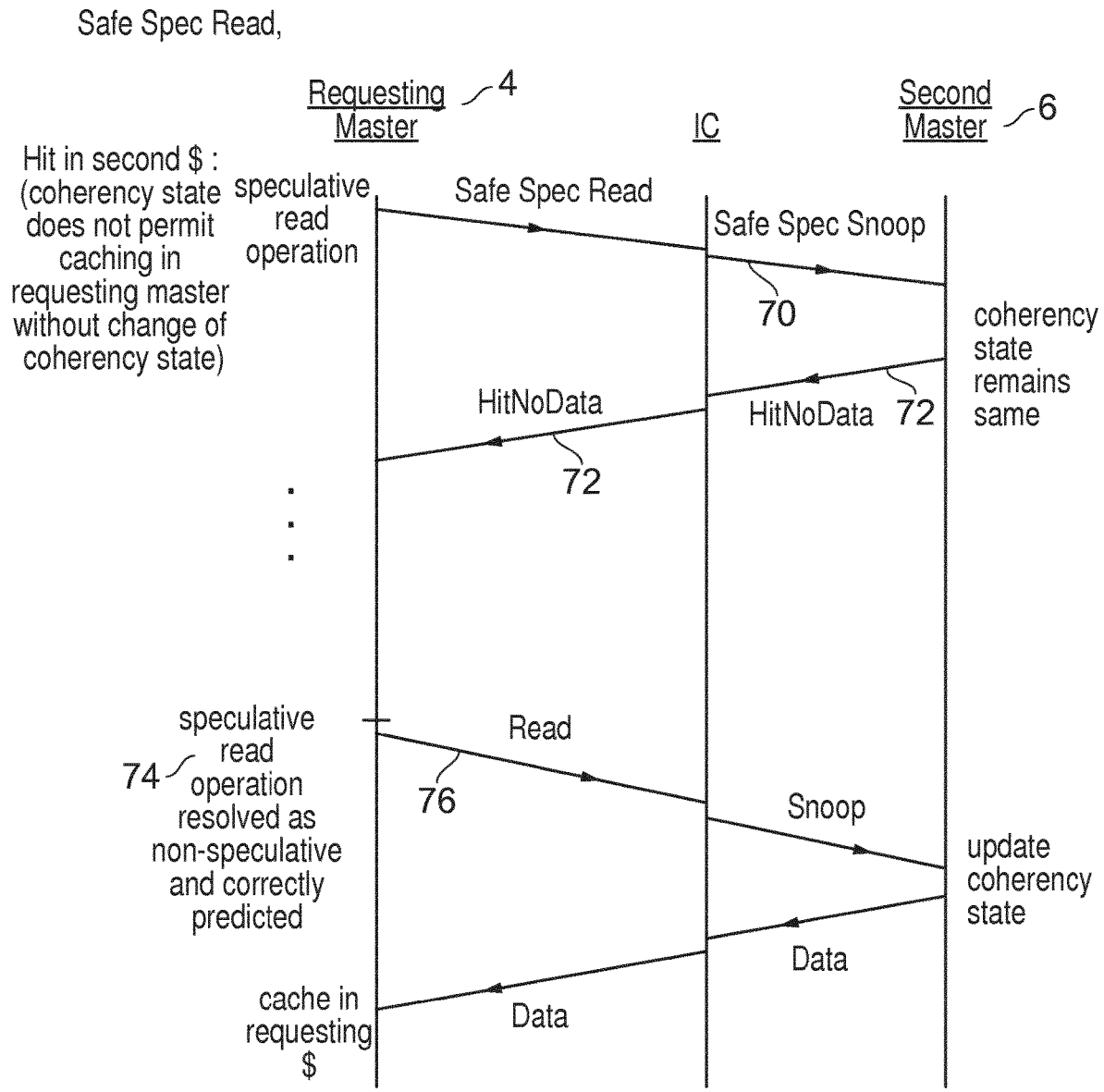

FIGS. 4A to 4C illustrate a safe-speculative-read transaction (coherency-change-prohibiting transaction) which can be used by a requesting master for speculative read operations to ensure that the read transaction cannot trigger any change in the coherency state of the requested data at other caches. FIG. 4A illustrates processing of the safe-speculative-read transaction in the case where the target data is cached in the cache 12 of a second master 6 in a coherency state which would permit caching of the data in the requesting cache 11 of the requesting master 4 without changing the coherency state in the second master's cache 12. For example, this could be a hit against data retained in the shared or owned states of a MOESI protocol, although it will be appreciated that in other protocols different states may be considered to permit caching in other masters. When the coherency state of the target data in the second master's cache 12 does permit caching in the requesting master, the response to the safe-speculative-read transaction may be the same as shown in FIG. 2A, in that the second master 6 returns the snooped data to the requesting master 4 via the interconnect 10 and then the data is cached in the requesting masters cache. The coherency state of the target data at the second master 6 in this case remains the same and so there is no change of coherency state to be probed by the attacker based on the speculation.

When the safe-speculative-read transaction results in a miss in the second master's cache 12 and in all other caches for which coherency is maintained by the interconnect 10, then this is handled in the same way as shown in FIG. 2B. Hence, FIG. 4B is exactly the same as FIG. 2B. Note that in FIGS. 4A and 4B the type of snoop request 70 issued to the second master 6 is a different type of snoop request to the snoop request shown in FIGS. 2A and 2B, to indicate to the second master that it can only return the data if it is held in a coherency state which permits caching of the data in the requesting masters cache as well.

As shown in FIG. 4C, in cases where the safe-speculative-read transaction triggers a hit in the cache of the second master 6 when the data is held in a coherency state which does not permit caching of the data in the requesting masters cache without a change of coherency state at the second master 6, then in this case the data is not returned and instead the second master 6 returns a HitNoData response 72. The HitNoData response indicates to the requesting master 4 that, while the data was present in the second master 6, it cannot currently be provided to the requesting master 4. Hence, no data is returned to the requesting master 4. As there is no caching of the target data at the requesting master 4, there is no need to change the coherency state of the data held at the second masters cache. By keeping the coherency state the same at the second master 4 in each of the three cases shown in FIGS. 4A, 4B and 4C, this avoids any opportunity for an attacker to gain side channel information from a change in coherency state triggered by a speculative operation.

When the requesting master 4 receives the HitNoData response 72, then it waits for the speculative read operation which triggered the safe-speculative-read transaction to be resolved as non-speculative and correctly predicted at step 74 of FIG. 4C. At this point the requesting master 4 then issues a further read transaction 76 (which could for example be a read of the type shown in FIGS. 2A and 2B which is then processed in the same way as shown in FIG. 2A, including a potential update of coherency state at the second master 6 if necessary). The further transaction causes the target data to be returned from the second master 6 to the requesting master 4 and cached in the cache 11 of the requesting master 4. At this point it is safe to update the coherency state of the data held at the second master 6 because the read operation is no longer speculative.

Hence if the attacker had used an incorrect speculation to trick the requesting master 4 into requesting access to data which was not intended by the author of the code being executed by the requesting master 4, then this read operation would have been resolved as mis-speculated and would have been cancelled, so that the further read transaction 76 would never have been triggered. Note that when the further read transaction 76 is issued, it is possible that by this point the target data could already have been invalidated from the cache of the second master 6, so sometimes the response to the further read transaction 76 could instead be as shown in FIG. 2B where it results in a miss and a linefill request to the further cache 30 or memory 33, instead of returning data from the cache of the second master 6.

An alternative approach to using the safe-speculative-read transaction shown in FIGS. 4A to 4C would be to only support a coherency-change-permitting read transaction as shown in FIGS. 2A and 2B, but to delay issuing this transaction until a given read operation at the requesting master 4 has been resolved as correctly speculated. However, in this case, in the event of a miss in other master's caches the linefill request issued to the further cache 30 or memory 33 would have to be delayed until the speculation has been resolved, which could trigger a long delay as the linefill request is typically associated with a much greater latency than the time taken to obtain the data from the cache of another master. In contrast, by supporting a safe-speculative-read transaction as shown in FIGS. 4A to 4C which guarantees that there will be no change of coherency state at other masters triggered by the transaction, this enables the linefill request to be triggered earlier in the miss case shown in FIG. 4B, as the line fill request can be triggered without waiting for the speculation to be resolved. Hence the support of such a safe-speculative-read transaction can help to improve performance while mitigating against the attack of the type discussed above.

Figure 5:
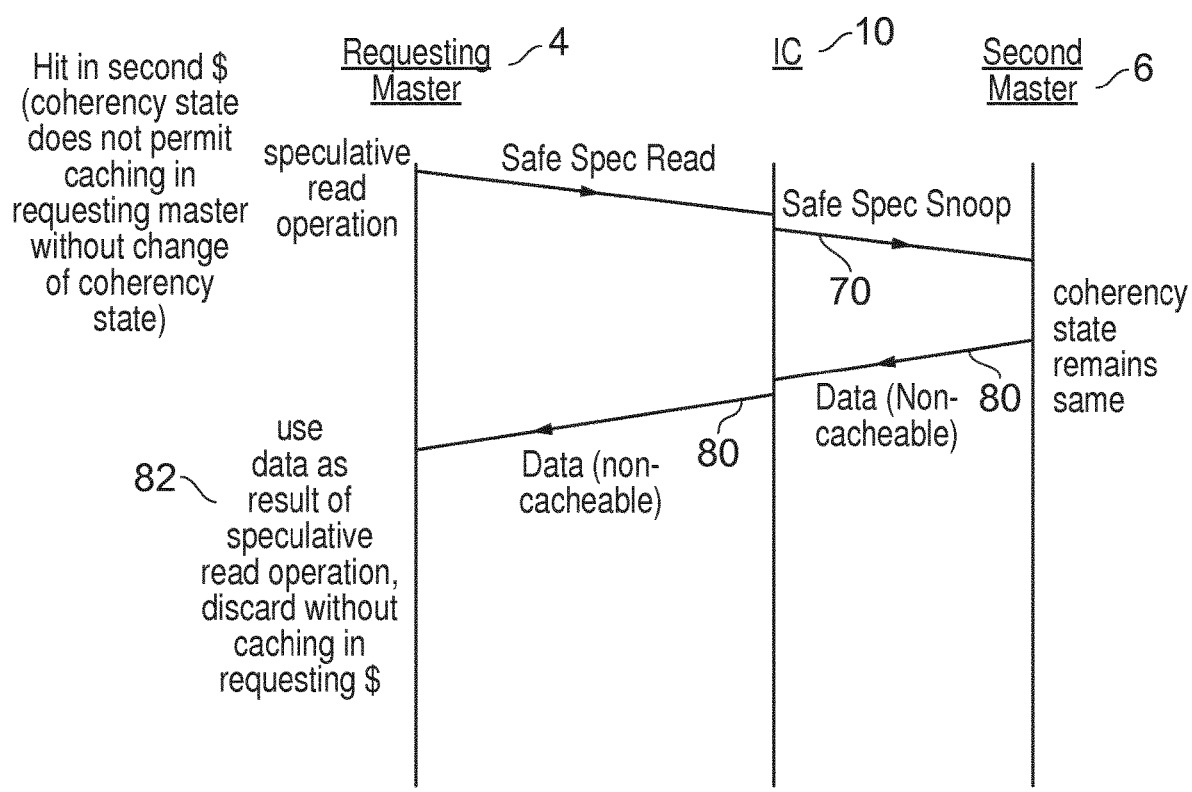
FIG. 5 shows a first alternative to FIG. 4C for handling a case when the safe-speculative-read transaction hits against data in a coherency state which does not permit caching in the requesting master's cache.

FIG. 5 shows an alternative approach to handling the situation shown in FIG. 4C. The miss case, and the case when the safe-speculative-read transaction hits in the second cache with the coherency state of the target data permitting caching in the requesting master, can be handled in the same way as shown in FIGS. 4B and 4A respectively. However, in the case when the transaction hits in the second cache but the data is held in a coherency state which does not permit caching in the requesting master without a change of coherency state at the second cache, in FIG. 5 instead of returning the HitNoData response 72, a non-cacheable read response 80 may be returned which does provide the target data from the second master 6, but indicates that the target data cannot be cached by the requesting master in a coherent manner. Hence, as the data will not be cached at the requesting master, there is no need to change the coherency state of the corresponding data in the cache 12 of the second master 6, and so again this prevents incorrectly speculative read operations being used to trigger changes in coherency state in other caches which may persist after the read operation has been determined to have been miss speculated. In response to the non-cacheable read response 80, at step 82 of FIG. 5 the requesting master 4 then uses the return data as the result of the speculative read operation so that subsequent operations which use that data can continue speculatively. However, having used the data as the result of the speculative read operation the return data is then discarded without caching it in the requesting cache 11 of the requesting master 4. This means that if a subsequent read operation triggers a memory access to the same address then this would once more trigger a transaction to be issued to the interconnect 10 to request the data. That is, in response to the non-cacheable read response 80, the requesting master 4 may write to the return data to its internal registers, but not to its cache.

In some implementations, the safe-speculative-read transaction may return the non-cacheable read response 80 shown in FIG. 5 when the coherency state at the second cache 12 does not permit caching at the requesting master's cache 11, but may trigger the behaviour shown in FIG. 4A in the case of the coherency state permitting caching at the requesting master's cache 11 or the behaviour of FIG. 4B when the request misses in the second cache 12.

Alternatively, other implementations could return the non-cacheable read response 80 both in the scenario shown in FIG. 5, but also in the scenario shown in FIG. 4A when the request hits in the second cache 12 and the coherency state does permit caching of the target data in the requesting cache 11. That is, even though in this case the data could have been cached in the requesting cache 11, the hardware implementation may be simpler if the safe-speculative-read transaction always returns the non-cacheable read response when the request hits in the second cache 12, regardless of the coherency state of the data cached in the second cache 12.

Figure 6:
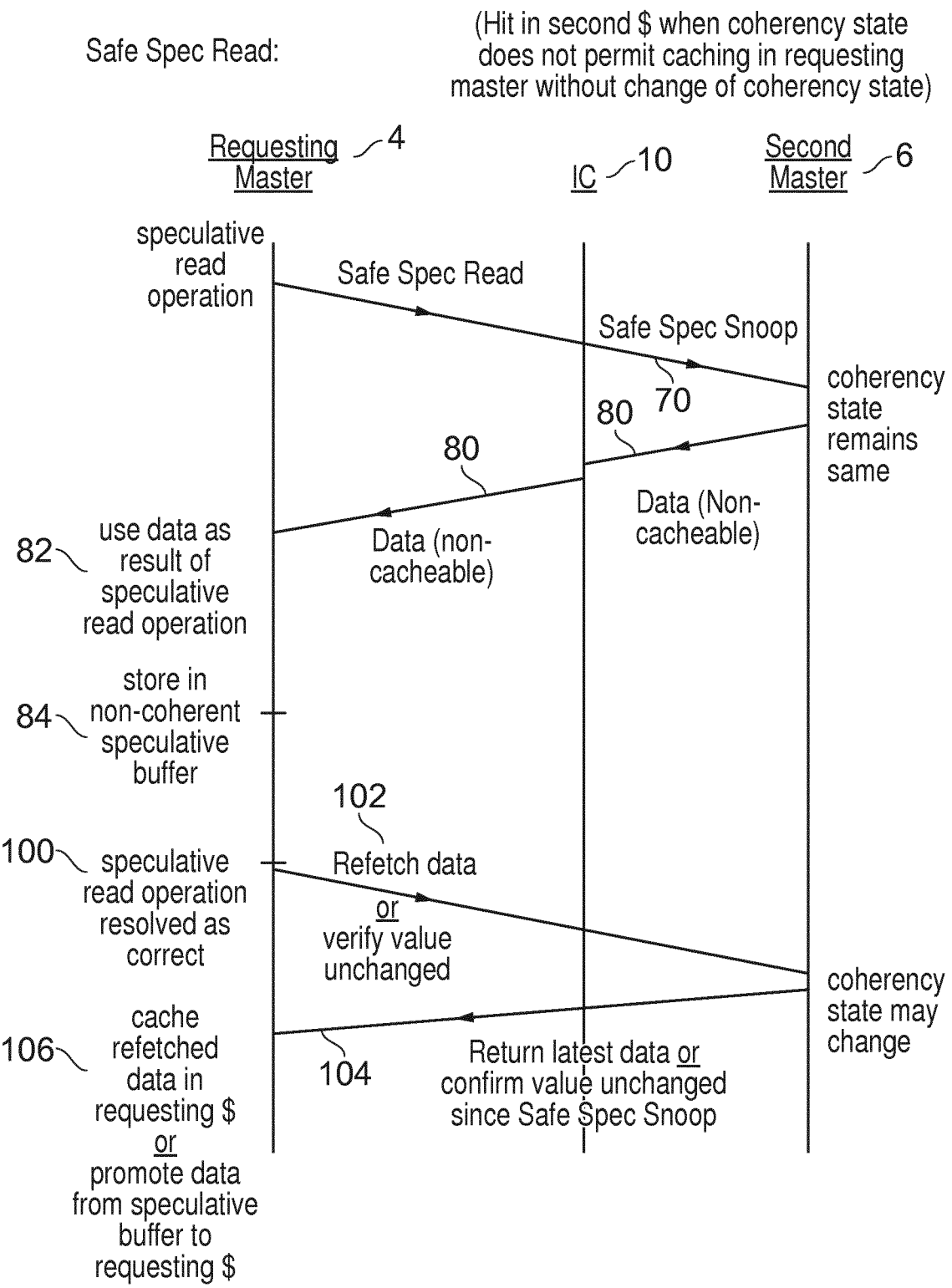
FIG. 6 shows a second alternative to handling the case shown in FIG. 4C.

FIG. 6 shows an alternative to FIG. 4C and FIG. 5. In FIG. 6, when the safe-speculative-read transaction triggers a hit in the cache of the second master 6 and the data is held in that cache in a coherency state which does not permit simultaneous caching in the cache of the requesting master 4 unless the coherency state is changed at the second master 6, then again the non-cacheable read transaction 80 is returned to the requesting master. However, as shown in FIG. 1 the requesting master 4 may have a speculative buffer 90 which may be used to buffer speculative results separately from its main cache 12. The speculative buffer 90 may be outside the coherency scheme managed by the coherent interconnect 10, and so values in the speculative buffer 90 cannot be guaranteed to remain coherent with corresponding data stored elsewhere in the system. Hence, while the non-cacheable read response 80 requires that the requesting master 4 cannot cache the data within the cache 11 subject to the coherency scheme, the requesting master 4 could still store the return data within the non-coherent speculative buffer 90. Hence, as well as writing the returned data to registers to use as the result of the speculative read operation at step 82 as in FIG. 5, with the approach shown in FIG. 6 the data is also stored to the non-coherent speculative buffer 90 at step 84. This means that subsequent read requests to the same address can be handled faster as they may hit against the speculative data in the speculative buffer 90.

However, with this approach then the requesting master 4 may need to take other steps for checking where the data is still coherent once the speculative read operation which triggered the original safe-speculative-read transaction has been resolved. At step 100 the requesting master 4 may determine that the speculative read operation has been resolved as correct. By this time there may have been changes in the target data at the second master 6 or in other locations within the system, so to ensure ongoing coherency and avoid polluting its cache 11 with out of date values, at step 102 the requesting master 4 may issue a request to upgrade the non-coherent copy of the data in the speculative buffer 90 to a coherent copy which can be allocated to its main cache 11. For example the coherent upgrade request could be a request to refetch the latest version of the target data (e.g. using the form of read transaction shown in FIGS. 2A and 2B), which when returned can then be cached in the requesting master's cache at step 106. Alternatively, if one of the interconnect 10 and the second master 6 tracks whether a write to the target data has occurred since the snoop triggered by the safe-speculative-read transaction was issued, then the coherent upgrade request could be a request to verify whether the data value could have changed. Either way, upon receipt of the response to the coherent upgrade request 104, the requesting master 4 can check whether there could have been a change in the data since it was cached in the speculative buffer (either by comparing the original and refetched data values, or by checking the response 104 indicating whether a write occurred), and if so can discard the speculative data from the speculative buffer 90 and cancel any subsequent operations which used that data, as these could have been based on an incorrect incoherent value. If the requesting master 4 confirms that execution of any subsequent operations based on the speculatively buffered data was correct, then the results of such operations can be maintained and the speculatively buffered data can be allocated to the main cache 11. The particular approach taken to ensure coherency following a non-coherent access to a buffer outside the control of the coherent interconnect 10 may be an implementation choice depending on the needs of a particular system and the particular coherency protocol being used. For example, existing memory disambiguation techniques could be used to check for coherency upon resolution of the speculatively performed read.

In general, the safe-speculative-read transaction shown in the examples above may be used for read operations triggered by speculative operations before it is known whether the target address of the read is correct or whether the read was even needed at all. However, in some cases the safe-speculative-read transaction could be used for all read requests, for example in some masters most if not all reads may be done speculatively so it may be simplest to always use the safe form of the read transaction.

However, in other systems it may be sometimes be possible to determine that there is a reduced risk of attacks of the form discussed above, and in that case it may be deemed suitable to use the coherency-change-permitting read form of the transaction even for speculative requests (for example if some other mitigating measure against side channel attacks is being taken). Using the coherency-change-permitting form of the read transaction in this case could in some cases improve performance by caching data returned from the second master earlier. Nevertheless, by providing the support for the safe form of the speculative read transaction this avoids the need to adopt other mitigation measures and ensures security.

Figure 7:
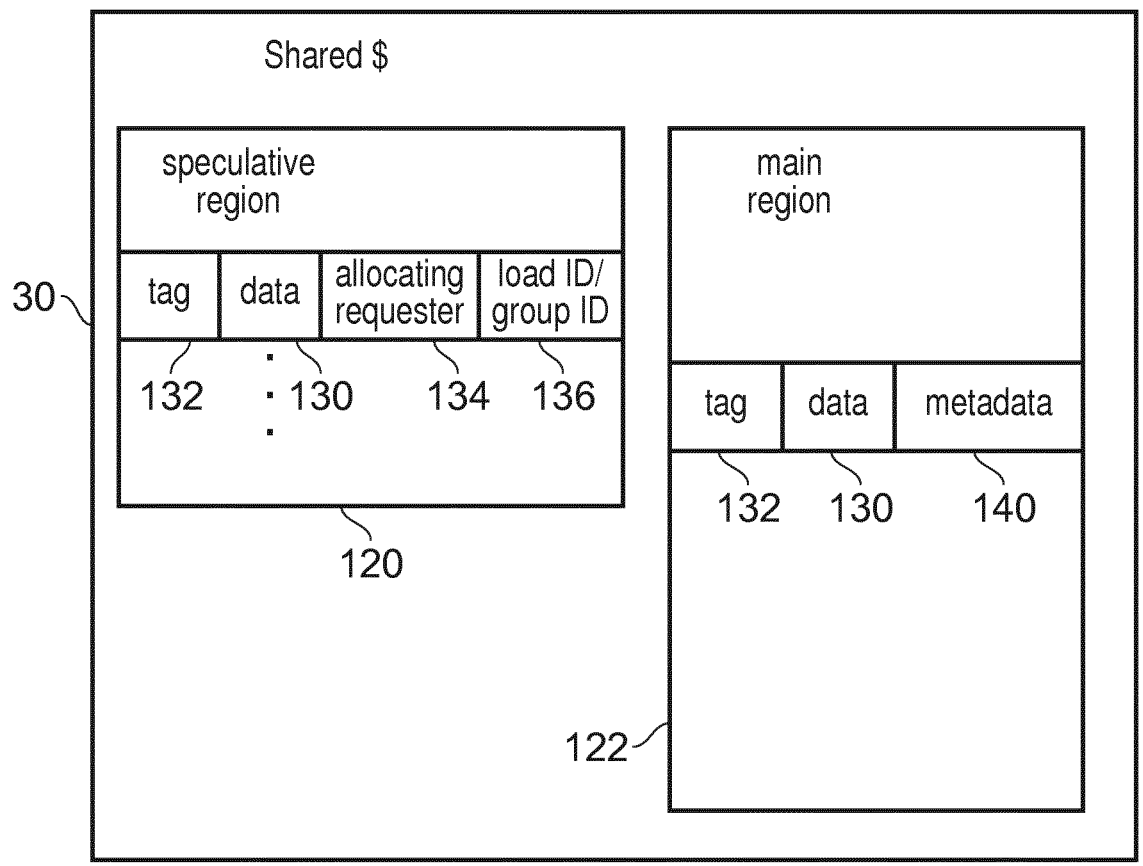
FIG. 7 shows an example of a shared cache for caching data allocated by multiple requesters.

FIG. 7 shows an example of a shared cache 30 which is shared between multiple requesters. An example is the system cache 30 which can be accessed by multiple masters 4, 6, or could be accessed independently by different software processes running on the same master 4. In the example of FIG. 7 the shared cache 30 includes a speculative region 120 and a main cache region 122. The speculative region 120 is used exclusively for speculatively allocated data while it remains speculative (i.e. the corresponding operation which caused it to be allocated has not yet been resolved as correct). The main region 122 is used exclusively for non-speculative data associated with operations which have since been resolved as correct. The entries in the speculative region store data 130 alongside an address tag 132 indicating part of the address of the data, an indication of the allocating requester 134 which caused the data to be allocated to the shared cache 30, and a load identifier or load group identifier 136 which provides an indication of which load operation or group of load operations cause the data to be allocated speculatively. This allows the shared cache 30 to track when data can be promoted from the speculative region 120 to the main region 122 once the load (or group of loads) which caused the data to be allocated have all been resolved as correctly performed. In contrast, data in the main region 122 may store the tag 132 and data 130 but need not provide information on the allocating request 134 or the load ID or group ID 136. As shown in FIG. 7, the main region may also specify other forms of metadata 140 associated with particular data entries. This metadata could also be indicative for entries in the speculative region, although this is not shown in FIG. 7 for conciseness. While FIG. 7 shows separate speculative and main cache regions 120, 122, in other embodiments these could be combined into a single region and additional metadata associated with each entry could mark whether the entry is considered speculative or non-speculative.

Figure 8:
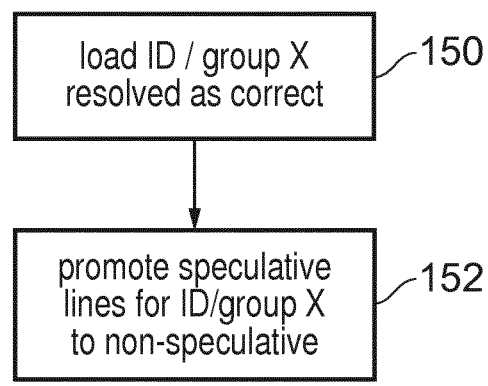
FIG. 8 is a method showing promotion of speculative entries to non-speculative entries upon resolution of speculation associated with a load operation that allocated the data.

FIG. 8 shows a flow diagram illustrating processing by the shared cache to determine when speculative entries can be promoted to the main region. At step 150 the shared cache receives an indication that a load operation associated with a particular load identifier X, or a group of loads associated with a particular group identifier X, have been resolved as correctly speculated. In response, at step 152 the shared cache promotes any speculative cache lines specifying as the load ID or group ID 136 the identifier X from speculative to non-speculative. The promotion from speculative to non-speculative could be achieved by either a physical transfer of the data from an entry of the speculative region 120 to an entry of the main region 122, or by updating metadata in a shared cache region to indicate that a speculative entry is now non-speculative.

While FIG. 8 shows an example which uses load identifiers or load group identifiers to identify which entries can be promoted to non-speculative when speculative loads are resolved as correct, other implementations could use the addresses of the cache entries to identify which entries can be promoted when the corresponding load operations are resolved as correct.

Figure 9:
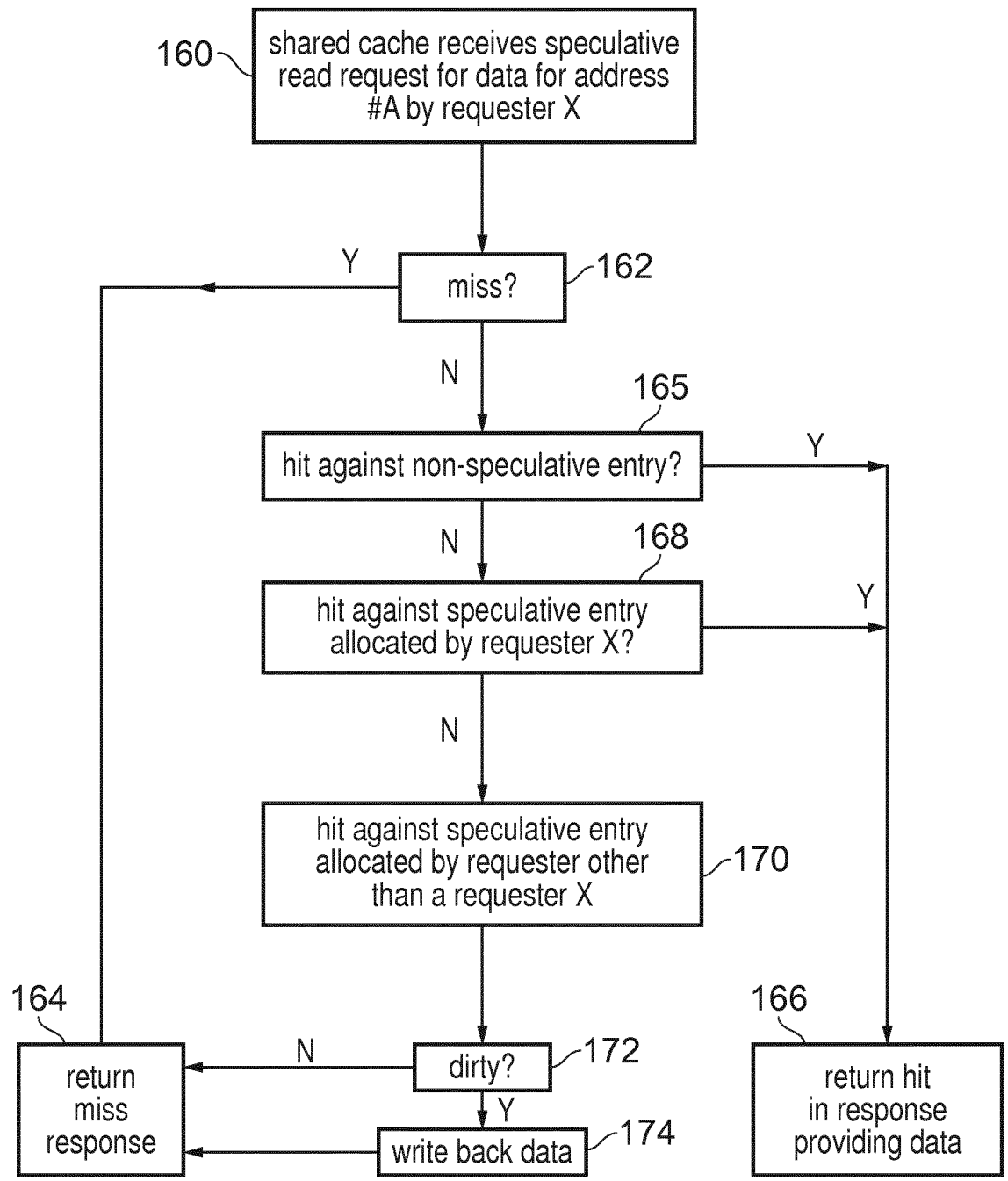
FIG. 9 shows a flow diagram illustrating a lookup of the shared cache in response to a read request triggered by a given requester.

FIG. 9 shows a flow diagram illustrating processing of a speculative read request for data for a given target address #A by a particular requester X. The requester X could be a particular master device 4, 6 or an individual process running on a master device. The request is received by the shared cache at step 160 of FIG. 9. At step 162 the shared cache 30 determines whether the request misses in the cache, that is there is no entry in either the speculative region 120 or the main region 122 associated with address #A. If there is a miss then at step 164 a miss response is returned. For example this could trigger the fetching of the data from a lower level cache or memory and/or allocation of a new entry associated with address #A (which would be allocated as a speculative entry if the read request which triggered the allocation is speculative).

If there was no miss then at step 165 it is determined whether the request hits against a non-speculative entry (either an entry in the main region 122, or an entry in a shared region which is indicated by metadata as being non-speculative). If so then at step 166 a hit response is returned to provide the data for access by requester X. The hit response would be returned for a non-speculative entry regardless of which requester caused the data to be allocated. Hence, non-speculative entries can be hit against by any requester (subject to any other memory access controlled permissions defined by the system). If at step 168 it is determined that the read request hits against a speculative entry allocated by requester X then again this is treated as a hit and a hit response is returned at step 166.

On the other hand, if at step 170 it is determined that the speculative read request hits against the speculative entry allocated by a requester other than requester X, then at step 172 it is determined whether the data is dirty (is modified relative to data in a further level cache or memory). If the data is dirty then at step 174 the data is written back to the further level cache or memory. If the data is clean then step 174 can be omitted. Either way, at step 164 the miss response is returned. Hence while data allocated to the shared cache remains speculative, only the requester who allocated the data can see the data and any other requesters cannot access the data. Also since the speculative data cannot be allocated to cause an eviction of non-speculative data in the shared cache, this means that requesters other than the requester who allocated the speculative entry are completely unaware of any effects of the speculatively allocated entry. This eliminates the opportunity for cache timing side channels to probe the speculative allocations and so prevents an attacker being able to use incorrectly speculated memory accesses and cache timing side channels to leak information on secret data.

As shown in FIG. 1, one of the master devices, in this example the CPU 4, may have a data prefetcher 200 for predicting future access patterns of memory accesses and prefetching the data of addresses predicted to be needed in future into the cache 11 before the corresponding memory access instructions are actually executed by the processor core of the master 4. For example the prefetcher 200 may detect certain stride patterns where the addresses accessed are a sequence of addresses separated at regular intervals. Once a stride pattern has been detected, then the prefetcher 200 could continue to fetch data into the cache 11 associated with addresses at intervals of the detected stride offset, until it is detected that the processor core is no longer executing data access instructions with addresses matching the stride pattern. This can improve performance As the data accesses triggered by the prefetcher 200 can be seen as a form of load speculation, in order to avoid invoking the coherency side channels discussed above the prefetcher may trigger data accesses of a type which use the safe-speculative-read transaction to obtain data from the coherent interconnect as discussed above.

However, even if the data accesses triggered by the prefetcher 200 do not trigger any changes in coherency state caches in other masters, they could still cause changes in the allocation in the cache 11 within the same master 4 which has the prefetcher 200. In particular, if the prefetcher 200 can be controlled by an attacker to prefetch data from addresses predicted speculatively based on some information that depends on secret information then the corresponding changes in allocations into the cache 11 could be probed using timing side-channels in order to leak information about the secret. For example, in the code example shown above the second data access could be replaced with a stream of accesses to memory locations with a well-defined pattern which uses a stride dependent on the secret. Hence, such a stream could trigger hardware prefetcher activity that could leak information by revealing the data stride and hence secrets. In other examples the secret could be used to derive the base address of the sequence of accesses and hence the prefetcher could reveal information on the base address. This problem is caused by the fact that typical hardware data prefetchers 200 would normally train the prediction circuitry based on the addresses of any issued memory accesses regardless of whether those accesses are performed speculatively or non-speculatively, and because it is normally allowable for data fetched by a hardware prefetcher 200 to evict non-speculative data from the cache 11.

Figure 10:
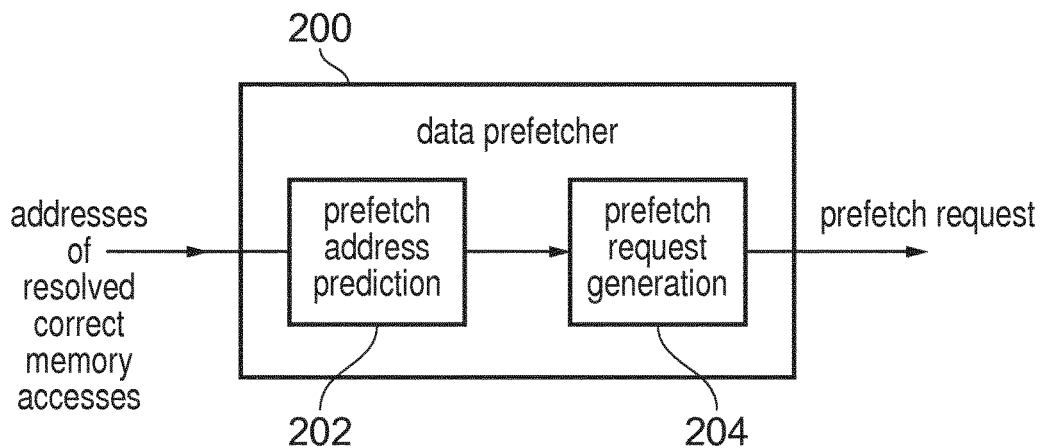
FIG. 10 shows an example of training a data prefetcher based on addresses of resolved correct memory accesses.
Figure 11:
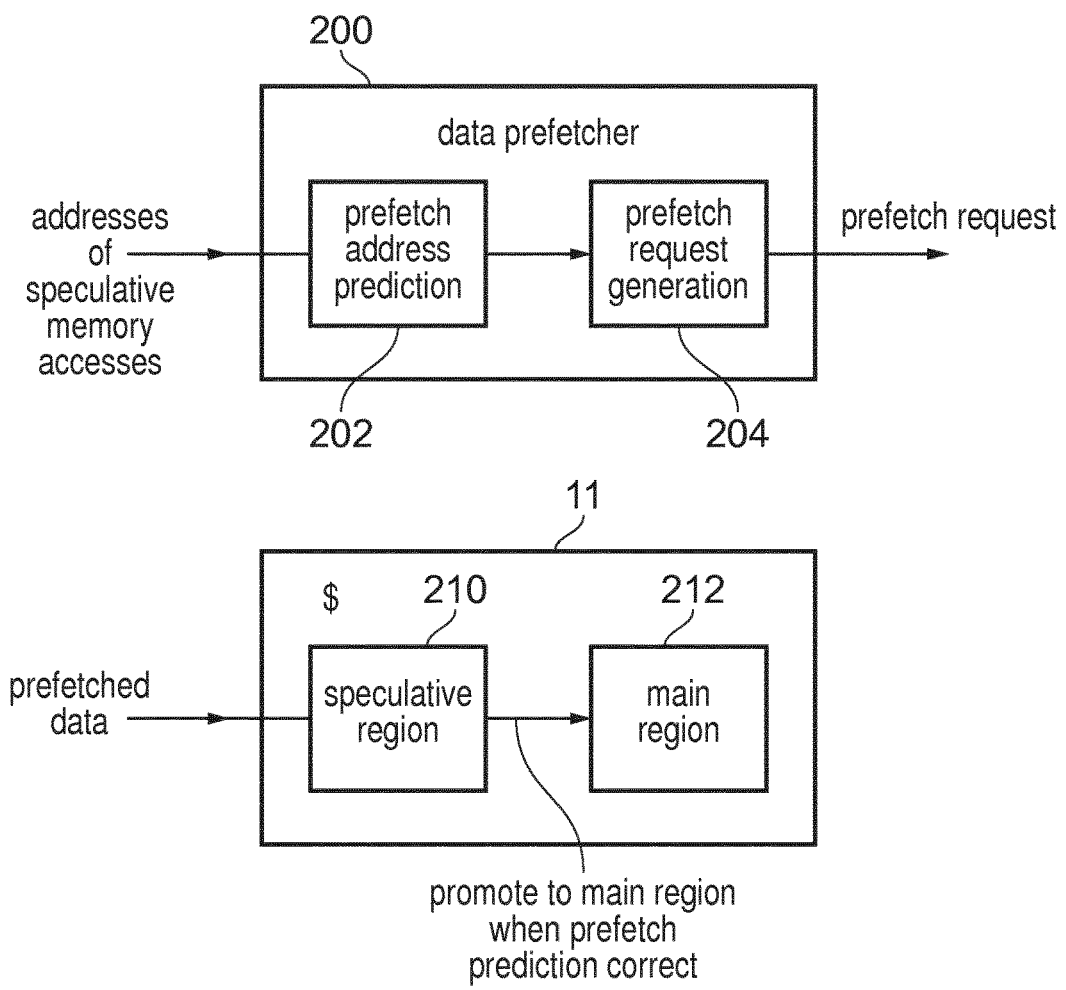
FIG. 11 illustrates an example where the data prefetcher is trained based on addresses of speculative memory accesses and the prefetch data is initially allocated into a speculative region of a cache.

Hence, by providing a hardware prefetcher 200 which is prohibited from evicting non-speculative data from the cache 11 to make way for prefetched data whose addresses were predicted based on previously accessed addresses of speculatively accessed transactions which had not been resolved as correct or incorrect, the avenue for an attacker to derive information from the prefetcher activity can be eliminated. FIGS. 10 and 11 show two alternative techniques for implementing this.

FIG. 10 shows a first example in which the data prefetcher has prefetch address prediction circuitry 202 which is trained based on the addresses of previously executed memory accesses which have already been resolved as correctly performed. Hence, prefetch request generation circuitry 204 may then generate prefetch requests based on the addresses predicted by the prefetch address prediction circuitry 202, to request the data from the coherent interconnect 10. Once the coherent interconnect 10 has returned the requested data then this may be cached in the cache 11 and may be allowed to evict previously allocated non-speculative data from the cache. In this case, as the incorrectly speculated memory accesses which an attacker could use to trigger inappropriate memory accesses to addresses depending on secret information are not used for training of the prefetch address prediction circuitry 202, then there is no risk associated with changing the pattern of cache allocation in the cache 11 based on the predicted prefetch addresses. It is safe to allocate prefetched data to the cache in the same manner as non-speculative data, so that any conventional cache allocation policy such as least recently used could be used. Hence, the elimination of incorrectly speculated addresses from the training of the prefetch address prediction circuitry 202 mitigates against the attack.

FIG. 11 shows an alternative approach for reducing the risk of attacks via the data prefetcher 200. In this case, the prefetch address prediction circuitry 202 of the prefetcher 200 is trained based on addresses of speculatively performed memory accesses before it is yet known whether the accesses are correct or incorrect. However, when the data prefetched from the predicted addresses is returned from the memory system, then the prefetch data is initially allocated into a speculative region 210 of the cache 12 which is maintained separate from the main cache region 212 used for caching non-speculative data. Hence, the allocation caused by the prefetching cannot result in eviction of non-speculative data from the main cache region 212. If there is a change in privilege level of the processor 4, or a speculation barrier instruction is executed, then the speculative region 210 can be flushed to ensure that less privileged processes cannot gain access to the prefetched data in case it was incorrectly speculated, reducing the chance of leakage of information accessed while in a more privileged state to software executed in a less privileged state. Note that the speculative region 210 could also be used for storing speculatively loaded data which is triggered by load/store instructions executed by the processor core, as well as the data prefetched by the prefetcher 200.

The data in the speculative region 210 can be promoted to the main region 212 when the prefetcher prediction (or other prediction used as basis for speculation) is determined to be correct. Hence, by using a dedicated speculative region 210 (which can be flushed when an event occurs which indicates that there may now be a risk that an attacker could gain access to potentially incorrectly speculated results) this preserves the main region 212 for the non-speculative results which have been determined to be correct. This means that even if a data prefetcher 200 can be trained based on the addresses of incorrectly speculated memory accesses to load data into the cache 11 with addresses that depend on the secret, the attacker who does not have access to the secret cannot gain access to information on the prefetched pattern of addresses through probing cache access times in the main region 212.

Further example arrangements are set out in the following clauses:

(1) An apparatus comprising:
a plurality of master devices; and
a shared cache shared between the master devices, for access on request by one of a plurality of requesters, each requester comprising a given master device or a given process executed on a given master device;
wherein in response to a request by a given requester to read target data speculatively allocated to the shared cache by an allocating requester, while an operation triggering the speculative allocation of the data remains speculative, the shared cache is configured to:
return a hit response providing the target data when the given requester is the allocating requester, and
return a miss response indicating that the data is absent from the further level cache when the given requester is a requester other than the allocating requester.

(2) An apparatus comprising:
processing circuitry capable of speculative execution of data access operations;
a cache to cache data obtained in response to data access operations; and
a data prefetcher to speculatively prefetch data into the cache associated with prefetch addresses predicted based on previously accessed addresses of data access operations executed by the processing circuitry;
wherein the cache and the data prefetcher are configured to prohibit data speculatively prefetched by the data prefetcher based on prefetch addresses predicted based on previously accessed addresses of speculatively executed data access operations from triggering an eviction of non-speculative data stored in the cache associated with data access operations already resolved as non-speculative.

(3) The apparatus of clause (2), in which the data prefetcher is configured to predict the prefetch addresses exclusively based on the previously accessed addresses associated with data access operations already resolved as non-speculative by the processing circuitry.

(4) The apparatus of clause (2), in which the cache comprises a main cache region and a speculative cache region, and the cache is configured to allocate data prefetched by the data prefetcher to the speculative cache region, and in response to a determination that the prediction of the prefetch address for a given item of data allocated to the speculative cache region was correct, to transfer the given item of data to the main cache region.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. A system comprising:
a plurality of master devices having associated caches; and
coherency control circuitry to manage coherency between the caches, based on a coherency protocol which assigns one of a plurality of coherency states to each item of data in a given cache; wherein:
the coherency control circuitry is configured to support processing of a safe-speculative-read transaction received from a requesting master device, the safe-speculative-read transaction of a type requesting that target data is returned to the requesting master device while prohibiting any change in coherency state associated with the target data in caches of other master devices in response to the safe-speculative-read transaction; and
in response to the safe-speculative-read transaction, at least when the target data is cached in a second cache associated with a second master device, at least one of the coherency control circuitry and the second cache is configured to return a safe-speculative-read response while maintaining the target data in the same coherency state within the second cache; and in response to the safe-speculative-read transaction, when the target data is absent from the second cache and any other caches managed according to the coherency protocol, the coherency control circuitry is configured to obtain the target data from a further level cache or memory shared between the plurality of master devices and return the target data to the requesting master device in a cacheable read response, the cacheable read response permitting the cache associated with the requesting master device to cache the target data.

2. The system according to claim 1, wherein in response to the safe-speculative-read transaction, when the target data is cached in the second cache in a coherency state in which caching of the target data in the requesting cache would not be permitted without changing the coherency state of the target data in the second cache, the safe-speculative-read response comprises a no-data response indicating that the target data cannot be provided by the second cache until a speculative read operation triggering the safe-speculative-read transaction is resolved as non-speculative.

3. The system according to claim 2, wherein in response to receipt of the no-data response, the requesting master device is configured to issue a further transaction to the coherency control circuitry when the speculative read operation has been resolved as non-speculative, said further transaction of a type requesting that the target data is returned to the requesting cache while permitting a change of coherency state associated with the target data in other caches.

4. The system according to claim 1, wherein in response to the safe-speculative-read transaction, when the target data is cached in the second cache in a coherency state in which caching of the target data in the requesting cache would not be permitted without changing the coherency state of the target data in the second cache, the safe-speculative-read response comprises a non-cacheable read response providing the target data to the requesting cache, the non-cacheable read response prohibiting the requesting cache from caching the target data.

5. The system according to claim 4, wherein in response to the non-cacheable read response, the requesting master device is configured to allocate the target data to a non-coherent speculative buffer for buffering data associated with speculative read operations while the speculative read operations remain speculative.

6. The system according to claim 5, wherein in response to the speculative read operation which triggered the safe-speculative-read transaction being resolved as non-speculative, the requesting master device is configured to issue a coherent upgrade request to the coherency control circuitry to request upgrading of a non-coherent version of the target data in the non-coherent speculative buffer to a coherent version of the target data.

7. The system according to claim 5, wherein in response to determining that a change to the target data since the target data was provided by the non-cacheable read response would cause incorrect execution, the requesting master device is configured to cancel subsequent operations speculatively executed based on the target data provided by the non-cacheable read response.

8. The system according to claim 4, wherein in response to the safe-speculative-read transaction, the safe-speculative-read response comprises the non-cacheable read response regardless of the coherency state of the target data in the second cache.

9. The system according to claim 1, wherein in response to the safe-speculative-read transaction, when the target data is cached in the second cache in a coherency state in which caching of the target data in the requesting cache would be permitted by the coherency protocol without changing the coherency state of the target data in the second cache, the safe-speculative-read response comprises a cacheable read response providing the target data, the cacheable read response permitting the requesting cache to cache the target data.

10. The system according to claim 1, comprising a further level cache shared between the plurality of master devices, for access on request by one of a plurality of requesters, each requester comprising a given master device or a given process executed on a given master device;

wherein in response to a request to read data speculatively allocated to the further level cache by an allocating requester, while an operation triggering allocation of the data remains speculative, the further level cache is configured to return a miss response indicating that the data is not cached in the further level cache when the request is triggered by a requester other than the allocating requester.

11. The system according to claim 10, wherein the further level cache is configured to store the speculatively allocated data in a speculative cache region separate from a main cache region for storing non-speculatively allocated data, and to transfer the speculative allocated data to the main cache region in response to an indication that the operation triggering allocation of the data has been resolved as non-speculative by the allocating requester.

12. The system according to claim 10, wherein the further level cache is configured to store metadata associated with each piece of data cached in the further level cache, the metadata indicative of whether the data remains speculative, and if the data remains speculative, which requester is the allocating requester.

13. An interconnect comprising:
a plurality of interfaces to communicate with master devices having associated caches; and
coherency control circuitry to manage coherency between the caches, based on a coherency protocol which assigns one of a plurality of coherency states to each item of data in a given cache; wherein:
the coherency control circuitry is configured to support processing of a safe-speculative-read transaction received from a requesting master device, the safe-speculative-read transaction of a type requesting that target data is returned to the requesting master device while prohibiting any change in coherency state associated with the target data in caches of other master devices in response to the safe-speculative-read transaction; and
in response to the safe-speculative-read transaction, at least when the target data is cached in a second cache associated with a second master device, the coherency control circuitry is configured to return, or request the second cache to return, a safe-speculative-read response while maintaining the target data in the same coherency state within the second cache; and in response to the safe-speculative-read transaction, when the target data is absent from the second cache and any other caches managed according to the coherency protocol, the coherency control circuitry is configured to obtain the target data from a further level cache or memory shared between the plurality of master devices and return the target data to the requesting master device in a cacheable read response, the cacheable read response permitting the cache associated with the requesting master device to cache the target data.

14. A master device comprising:
processing circuitry capable of speculative execution of data access operations; and
interface circuitry to issue transactions to an interconnect for managing coherency between a cache of the master device and at least one other cache, based on a coherency protocol which assigns one of a plurality of coherency states to each item of data in a given cache;
wherein in response to the processing circuitry speculatively executing a read operation to request target data absent from the cache of the master device, the interface circuitry is configured to issue to the interconnect a safe-speculative-read transaction of a type requesting that the target data is returned to the master device while prohibiting any change in coherency state associated with the target data in said at least one other cache in response to the safe-speculative-read transaction, and when the target data is absent from the at least one other cache managed according to the coherency protocol, to receive the target data in a cacheable read response received from the interconnect in response to the safe-speculative-read transaction, the cacheable read response permitting the cache of the master device to cache the target data.

* * * * *